(12) United States Patent
Huang et al.

(10) Patent No.: US 11,977,979 B2
(45) Date of Patent: May 7, 2024

(54) ADAPTIVE BOUNDING FOR THREE-DIMENSIONAL MORPHABLE MODELS

(71) Applicant: QUALCOMM Incorporated, San Diego, CA (US)

(72) Inventors: Kuang-Man Huang, Zhubei (TW); Min-Hui Lin, KHH (TW); Ke-Li Cheng, San Diego, CA (US); Michel Adib Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/384,522

(22) Filed: Jul. 23, 2021

(65) Prior Publication Data

US 2023/0035282 A1    Feb. 2, 2023

(51) Int. Cl.
 *G06V 40/16* (2022.01)
 *G06N 3/08* (2023.01)
 *G06T 17/00* (2006.01)

(52) U.S. Cl.
 CPC .............. *G06N 3/08* (2013.01); *G06T 17/00* (2013.01); *G06V 40/174* (2022.01); *G06T 2210/44* (2013.01)

(58) Field of Classification Search
 None
 See application file for complete search history.

(56) References Cited

U.S. PATENT DOCUMENTS

| 10,970,907 B1 | 4/2021 | Albuz et al. |
| 2015/0169938 A1* | 6/2015 | Yao ............. G06V 40/176 382/103 |
| 2017/0091535 A1 | 3/2017 | Yu et al. |
| 2019/0035149 A1* | 1/2019 | Chen ............. G06V 40/166 |
| 2021/0165998 A1 | 6/2021 | Cao et al. |

OTHER PUBLICATIONS

International Search Report and Written Opinion—PCT/US2022/031987—ISA/EPO—dated Sep. 5, 2022.
Zhibo W., et al., "Emotion-Preserving Blendshape Update with Real-Time Face Tracking", IEEE Transactions on Visualization and Computer Graphics, IEEE, USA, vol. 28, No. 6, Oct. 26, 2020, pp. 2364-2375, XP011907100, ISSN: 1077-2626, DOI: 10.1109/TVCG.2020.3033838.

* cited by examiner

*Primary Examiner* — Idowu O Osifade
(74) *Attorney, Agent, or Firm* — Polsinelli LLP/Qualcomm

(57) ABSTRACT

Systems and techniques are provided for generating one or more models. For example, a process can include obtaining a plurality of input images corresponding to faces of one or more people during a training interval. The process can include determining a value of the coefficient representing at least the portion of the facial expression for each of the plurality of input images during the training interval. The process can include determining, from the determined values of the coefficient representing at least the portion of the facial expression for each of the plurality of input images during the training interval, an extremum value of the coefficient representing at least the portion of the facial expression during the training interval. The process can include generating an updated bounding value for the coefficient representing at least the portion of the facial expression based on the initial bounding value and the extremum value.

30 Claims, 17 Drawing Sheets

ADAPTIVE BOUNDING FOR THREE-DIMENSIONAL MORPHABLE MODELS

FIELD

The present disclosure generally relates to systems and techniques for generating three-dimensional (3D) models for faces.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame, and can be used to facilitate effective operation of various systems. Examples of such applications and systems include augmented reality (AR), robotics, automotive and aviation, three-dimensional scene understanding, object grasping, object tracking, in addition to many other applications and systems.

SUMMARY

In some examples, systems and techniques are described herein for generating one or more models. According to at least one example, a method of processing one or more frames is provided. The method includes: obtaining an initial bounding value for a coefficient representing at least a portion of a facial expression; obtaining a plurality of input images corresponding to faces of one or more people during a training interval; determining a value of the coefficient representing at least the portion of the facial expression for each of the plurality of input images during the training interval; determining, from the determined values of the coefficient representing at least the portion of the facial expression for each of the plurality of input images during the training interval, an extremum value of the coefficient representing at least the portion of the facial expression during the training interval; and generating an updated bounding value for the coefficient representing at least the portion of the facial expression based on the initial bounding value and the extremum value.

In another example, an apparatus for training one or more machine learning models is provided that includes a memory and a processor coupled to the memory. The one or more processors are configured to: obtain an initial bounding value for a coefficient representing at least a portion of a facial expression; obtain a plurality of input images corresponding to faces of one or more people during a training interval; determine a value of the coefficient representing at least the portion of the facial expression for each of the plurality of input images during the training interval; determine, from the determined values of the coefficient representing at least the portion of the facial expression for each of the plurality of input images during the training interval, an extremum value of the coefficient representing at least the portion of the facial expression during the training interval; and generate an updated bounding value for the coefficient representing at least the portion of the facial expression based on the initial bounding value and the extremum value.

In another example, a non-transitory computer-readable medium is provided that has stored thereon instructions that, when executed by one or more processors, cause the one or more processors to: obtain an initial bounding value for a coefficient representing at least a portion of a facial expression; obtain a plurality of input images corresponding to faces of one or more people during a training interval; determine a value of the coefficient representing at least the portion of the facial expression for each of the plurality of input images during the training interval; determine, from the determined values of the coefficient representing at least the portion of the facial expression for each of the plurality of input images during the training interval, an extremum value of the coefficient representing at least the portion of the facial expression during the training interval; and generate an updated bounding value for the coefficient representing at least the portion of the facial expression based on the initial bounding value and the extremum value.

In another example, an apparatus for training one or more machine learning models is provided. The apparatus includes: means for obtaining an initial bounding value for a coefficient representing at least a portion of a facial expression; means for obtaining a plurality of input images corresponding to faces of one or more people during a training interval; determining a value of the coefficient representing at least the portion of the facial expression for each of the plurality of input images during the training interval; means for determining, from the determined values of the coefficient representing at least the portion of the facial expression for each of the plurality of input images during the training interval, an extremum value of the coefficient representing at least the portion of the facial expression during the training interval; and means for generating an updated bounding value for the coefficient representing at least the portion of the facial expression based on the initial bounding value and the extremum value.

In some aspects, the method, apparatuses, and computer-readable medium described above further comprise: applying a clamp loss function based on the initial bounding value during the training interval.

In some aspects, the method, apparatuses, and computer-readable medium described above further comprise: during a subsequent training interval, apply the clamp loss function based on the updated bounding value.

In some aspects, applying the clamp loss function comprises determining a difference between the extremum value and the initial bounding value.

In some aspects, the training interval is an epoch of a training dataset.

In some aspects, the training interval is less than or equal to half an epoch of a training dataset.

In some aspects, the coefficient representing at least the portion of the facial expression is a blendshape coefficient.

In some aspects, generating the updated bounding value for the coefficient representing the facial expression comprises calculating a weighted average of the initial bounding value and the extremum value.

In some aspects, the initial bounding value and the extremum value are weighted equally.

In some aspects, the initial bounding value is different from the updated bounding value.

In some aspects, the initial bounding value comprises a maximum allowed value or a minimum allowed value of the coefficient representing the facial expression during the training interval.

In some aspects, the plurality of input images corresponding to faces of one or more people is included in a training dataset and the training dataset includes a plurality of landmark features associated with the plurality of input images.

In some aspects, the one or more processors are configured to generate a three-dimensional facial model based at least in part on the value of the coefficient representing at least the portion of the facial expression.

In some aspects, the three-dimensional facial model includes a three-dimensional morphable model (3DMM).

In another example, apparatus for generating a three-dimensional facial model is provided that includes a memory and one or more processors coupled to the memory. The one or more processors is configured to: obtain an input facial image; generate, by a machine learning model, a coefficient representing at least a portion of a facial expression based on the input facial image, wherein at least one of a maximum value and a minimum value corresponding to the coefficient representing the facial expression has a value trained according to an adaptive bounding training technique; and output a three-dimensional model corresponding to the input facial image based at least in part on the coefficient representing at least the portion of the facial expression.

In some aspects, training according to an adaptive bounding training technique includes: obtaining an initial bounding value for the coefficient representing at least the portion of the facial expression; obtaining a plurality of input images corresponding to faces of one or more people during a training interval; determining a value of the coefficient representing at least the portion of the facial expression for each of the plurality of input images during the training interval; determining, from the determined values of the coefficient representing at least the portion of the facial expression for each of the plurality of input images during the training interval, an extremum value of the coefficient representing at least the portion of the facial expression during the training interval; and generating an updated bounding value for the coefficient representing at least the portion of the facial expression based on the initial bounding value and the extremum value.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
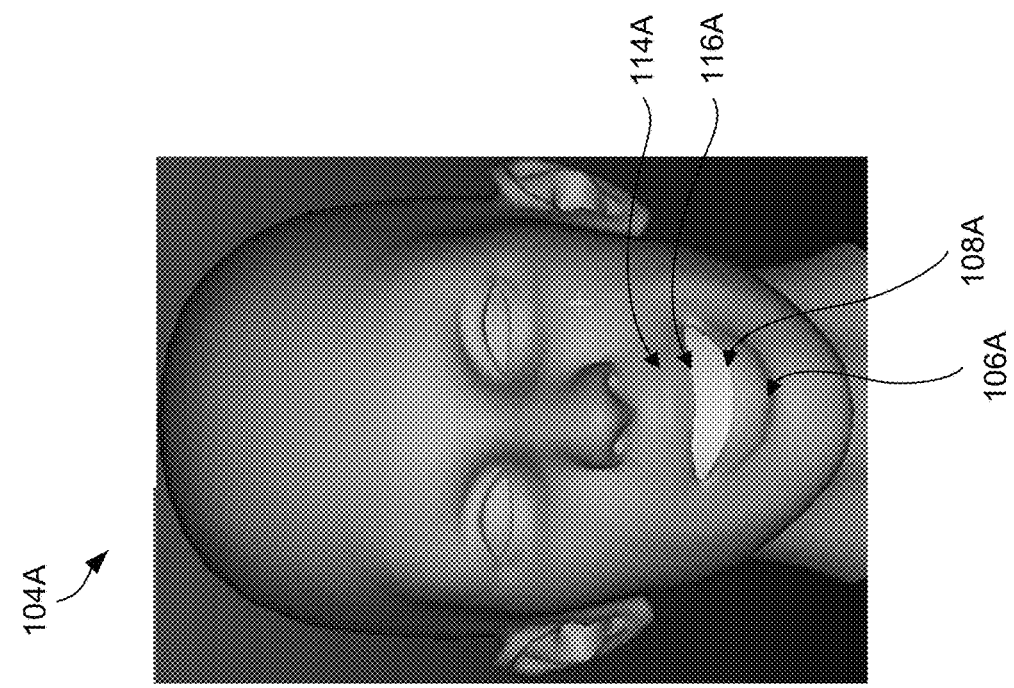
FIG. 1A and FIG. 1B illustrate example three-dimensional (3D) facial models and corresponding two-dimensional (2D) facial images overlaid with landmarks projected from the 3D facial models, in accordance with some examples.
Figure 1A:
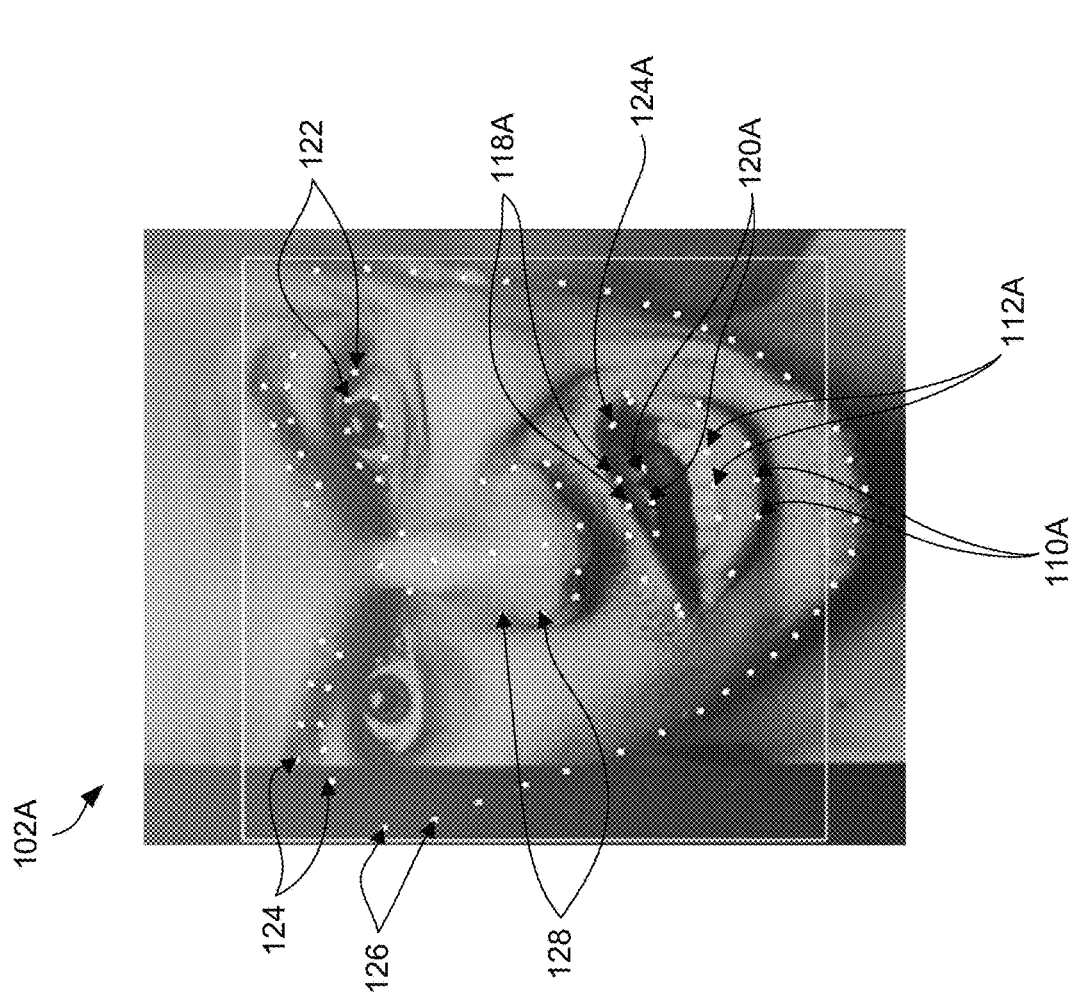

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual airplane representing a real airplane sitting on a runway may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications that use face data (e.g., for XR systems, for 3D graphics, for security, among others), leading to a large demand for systems with the ability to generate detailed 3D face models (as well as 3D models of other objects) in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others. Generating a detailed 3D model of an object (e.g., a 3D face model) typically requires expensive equipment and multiple cameras in an environment with controlled lighting, which hinders large-scale data collection.

Performing 3D object reconstruction (e.g., to generate a 3D model of an object, such as a face model) from one or more images can be challenging. Using a face as an illustrative example of a 3D object, 3D face reconstruction can be difficult based on the need to reconstruct the face geometry (e.g., shape) and the facial expression. In some cases, when representing a 3D face model, the constraints placed on coefficients used to generate a 3D face model can result in the inability of the model to accurately reproduce facial expressions. In some cases, the constraints can be provided to prevent the 3D face model from including artifacts, such as anatomically impossible facial expressions.

FIG. 1A illustrates a two-dimensional (2D) facial image 102A and a corresponding 3D facial model 104A generated from the 2D facial image 102A. As will be described in more detail below (e.g., with respect to FIG. 2 and FIG. 3), the 3D facial model 104A can include a representation of the facial expression in the 2D facial image 102A. In some examples, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector.

As illustrated in FIG. 1A, the white dots overlaid on the 2D facial image 102A can represent a projection of the 3D facial model 104A back onto the original 2D facial image 102A used to generate the 3D facial model 104A. For instance, in the illustration of FIG. 1A, points corresponding to 3D vertices of major features of the 3D facial model (which can be referred to as landmarks or 2D landmarks) are depicted as white dots. As shown, landmarks are included for the outlines of lips, nose, mouth, eyes, eyebrows, nose, among others. Although the 3D facial model may contain a much larger number of vertices, for purposes of illustration, only a small number of vertices corresponding to the above listed facial shapes are shown. In the illustrated example of FIG. 1A, landmarks corresponding to the inner contour 108A of the lower lip of the 3D facial model 104A projected onto a 2D image can include landmarks 112A. Similarly, the landmarks corresponding to the outer contour 106A of the lower lip of the 3D facial model 104A can include landmarks 110A.

FIG. 1A also illustrates the outer contour 114A and inner contour 116A of the upper lip of the 3D facial model 104A. In some examples, landmarks corresponding to the outer contour 114A of the upper lip can include landmarks 118A and 124A and landmarks corresponding to the inner contour 116A of the upper lip can include landmarks 120A. Additional landmarks projected from the 3D facial model 104A can include landmarks 122 corresponding to the left eye, landmarks 124 corresponding to the right eyebrow, landmarks 126 corresponding to the overall face outline, and landmarks 128 corresponding to the nose. As noted above, each of the landmarks 122, 124, 126, and 128 can result from a projection of the 3D facial model 104A onto the 2D facial image 102A.

As illustrated in FIG. 1A, the 2D facial image 102A includes a facial expression where the left side of the mouth (on the right side of the image) is open significantly more than the right side of the mouth (on the left side of the image). However, as seen in the 3D facial model 104A, the expression of the mouth, particularly the upper lip contours 114A and 116A show a smaller discrepancy between the right and left side of the mouth relative to the 2D facial image. Such a difference can also be seen from the landmarks 118A of the upper lip, and in particular from the landmark 124A of the upper lip that falls within the inner contour of the upper lip in the 2D facial image 102A. In some cases, the mismatch between the 3D facial model 104A and the 2D facial image 102A can result from a constraint on a facial expression coefficient (e.g., a blendshape coefficient) that corresponds to movement of the upper lip (or the left side of the upper lip), which is used to generate the 3D facial model 104A. For example, the upper bound for a blendshape coefficient (or coefficients) corresponding to movement of the upper lip may be equal to the maximum and/or minimum value (collectively, the extremum values) of the blendshape coefficient permitted by the constraint in the 3D facial model 104A. In some cases, the facial expression coefficients can be constrained to prevent the 3D facial model from including unrealistic artifacts, such as an unrealistically large opening of the mouth, a contorted facial expression, facial movements that are anatomically impossible, and/or other unrealistic expressions. In some aspects, the appearance of an unrealistic (e.g., anatomically impossible) facial expression in a 3D facial model 104A may be desirable in some applications (e.g., in animation applications) and undesirable in others (e.g., applications where natural and realistic 3D facial models are desired).

As shown in FIG. 1A, in contrast to the upper lip, the outer contour 106A of the lower lip and inner contour 108A of the lower lip of the 3D facial model 104A projected onto the 2D facial image 102A result in landmarks 110A and 112A that are well aligned with the inner and outer contours of the 2D facial image 102A. In some cases, such an alignment can be indicative that the values of the blendshape coefficients corresponding to movement the lower lip fall within the constraints in the 3D facial model 104A.

Systems, apparatuses, processes (or methods), and computer-readable media (collectively referred to as "systems and techniques") are described herein for generating a 3D model of a particular portion of an object from a video (e.g., a video having a Red (R), Green (G), Blue (B) format, referred to as an RGB video) including a sequence of frames or from one or more images (e.g., grayscale images or RGB images). In some examples, as described in more detail below, the systems and techniques can generate a 3D model of an object (e.g., a 3D model of a face of a person) based on one or more frames depicting the object. The systems and techniques can adaptively determine bounding values (e.g., upper and/or lower bounds) for coefficients corresponding to facial expressions to ensure that a wide variety of facial expressions (e.g., irregular and/or extreme facial expressions) can be represented by the 3D facial model. In some examples, the systems and techniques can train a machine learning model with training data to adaptively determine the bounding values for the coefficients corresponding to the facial expressions.

Figure 1B:
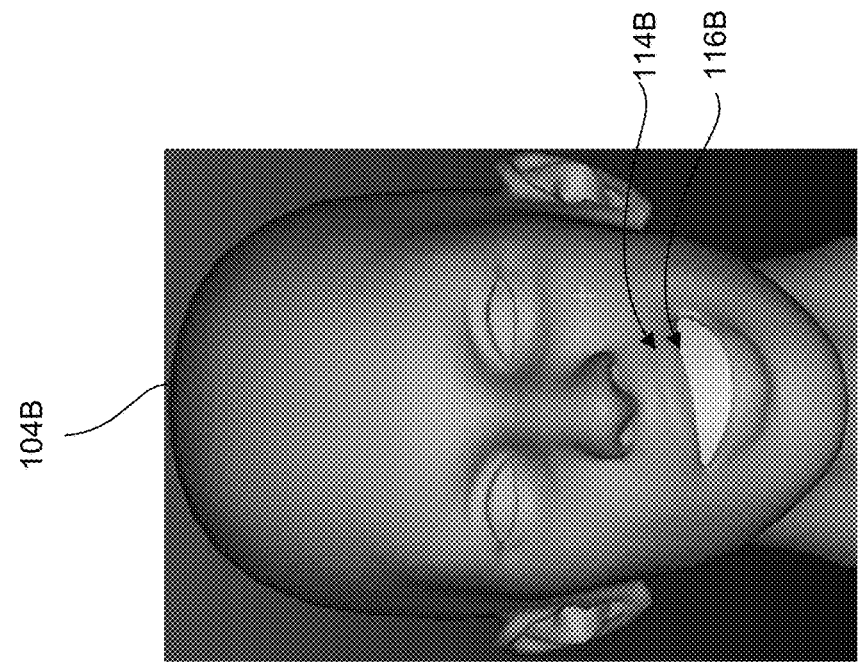
Figure 1B:
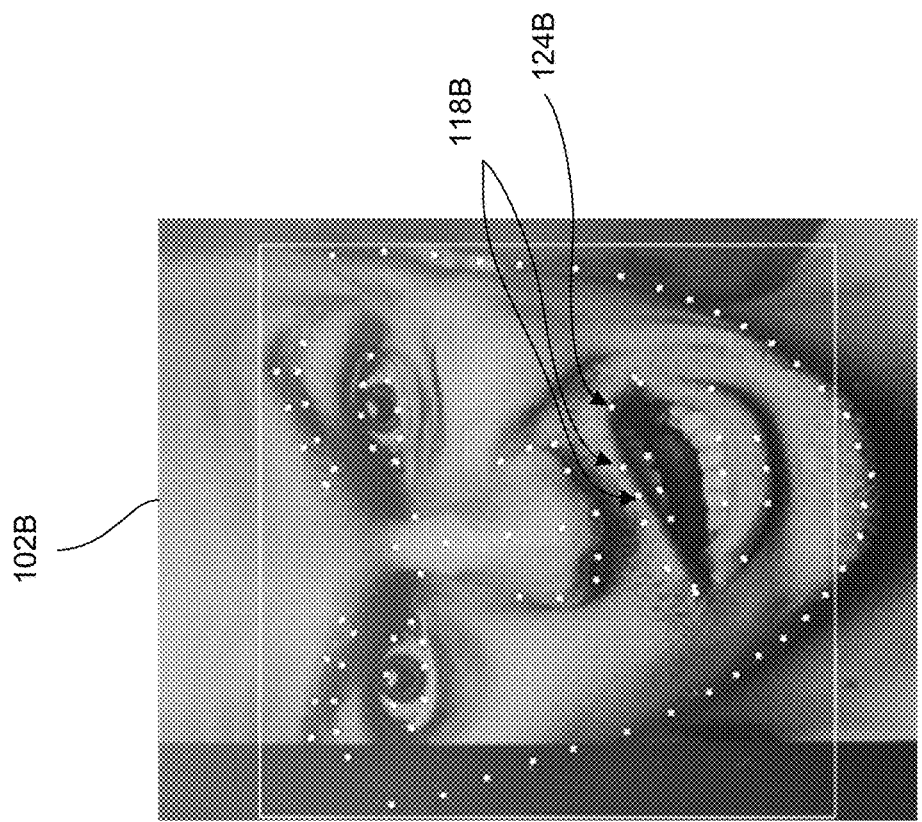

FIG. 1B illustrates a second example 3D facial model 104B and corresponding landmarks overlaid over the 2D facial image 102B. In the illustrated 3D facial model 104B, constraints for some of the facial expressions, such as constraints on facial expression coefficients (e.g., blendshape coefficients), have been modified relative to the constraints on the facial expression coefficients used to generate the 3D facial model 104A of FIG. 1A. In the illustrated example of FIG. 1B, the underlying blendshape basis vectors that are scaled by the blendshape coefficients are unchanged. As shown in FIG. 1B, the outer contour 114B and inner contour 116B of the upper lip create a more pronounced opening on the left side of the mouth (on the right side of the image) of the 3D facial model 104B when compared to the 3D facial model 104A of FIG. 1A. For example, the landmarks 118B corresponding to the outer contour of the upper lip more closely align with the outer contour of the upper lip in the 2D facial image 102B. Similarly, the landmark 124B appears closer to the outer contour of the upper lip in the 2D facial image 102B when compared to the corresponding landmark 124A in FIG. 1A. The examples of FIG. 1A and FIG. 1B illustrate that in some circumstances, modifying or extending the constraints on blendshape coefficients can result in a more accurate recreation of a facial expression in a 3D facial model generated from a 2D facial image.

While faces are used herein as illustrative examples of objects that can be modeled, the systems and techniques described herein can be applied to generate models for any type of objects. Furthermore, movement of the upper and lower lips will be used herein as illustrative examples of facial expressions for illustrative purposes. However, one of ordinary skill will appreciate that the systems and techniques described herein can be performed for any facial expression that can be generated with the facial expression basis vectors (e.g., blendshape vectors) of a chosen 3D model. In one illustrative example, similar systems and techniques can be applied to facial expressions involving the eyebrows, eyes, nose, ears, or any other portion of the face. In another illustrative example, similar systems and techniques can be applied to data driven adaptive bounding techniques for any 3D model that has a fixed bounding range (e.g., a fixed upper bound and a fixed lower bound) for coefficients used to generate the 3D model during training.

Figure 2:
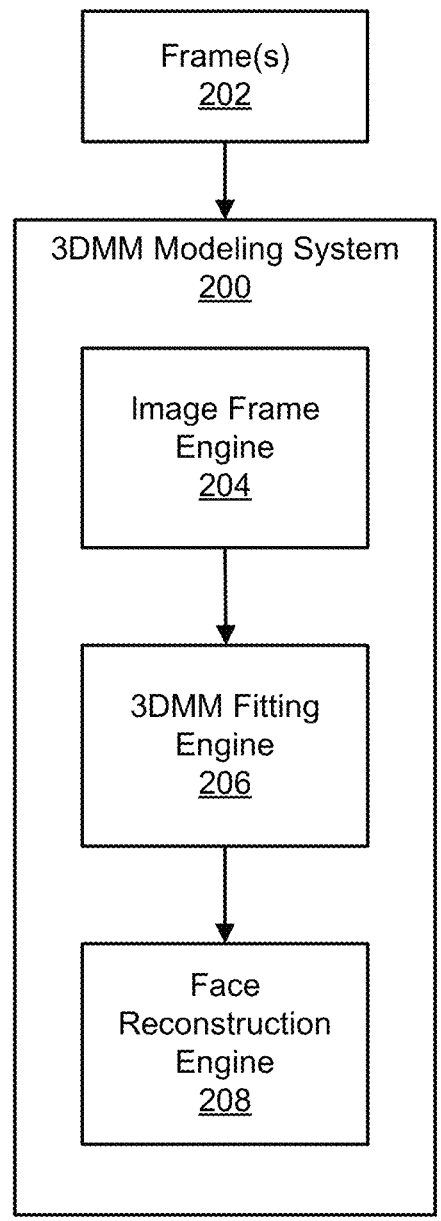
FIG. 2 is a diagram illustrating an example of a 3D modeling system, in accordance with some examples.

FIG. 2 is a diagram illustrating an example of a 3D modeling system 200 that can generate a 3D model (e.g., a 3D morphable model (3DMM)) using at least one image frame 202. As shown in FIG. 2, the 3D modeling system 200 includes an image frame engine 204, a 3D model fitting engine 206, and a face reconstruction engine 208. While the 3D modeling system 200 is shown to include certain components, one of ordinary skill will appreciate that the 3D modeling system 200 can include more components than those shown in FIG. 1. The components of the 3D modeling system 200 can include software, hardware, or one or more combinations of software and hardware. For example, in some implementations, the components of the 3D modeling system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the 3D modeling system 200.

The image frame engine 204 can obtain or receive an image frame 202 captured by an image sensor, from storage, from memory, from an external source (e.g., a server, an external memory accessed via a network, or other external source), or the like. In some cases, the image frame can be included in a sequence of frames (e.g., a video, a sequence of standalone or still images, etc.). In one illustrative example, each frame of the sequence of frames can include a grayscale component per pixel. Other examples of frames include frames having red (R), green (G), and blue (B) components per pixel (referred to as an RGB video including RGB frames), luma, chroma-blue, chroma-red (YUV, YCbCr, or Y'CbCr) components per pixel and/or any other suitable type of image. The sequence of frames can be captured by one or more cameras, obtained from storage, received from another device (e.g., a camera or device including a camera), or obtained from another source. In some implementations, the image frame engine 204 can convert the image frame 202 to grayscale. The image frame engine 204 can, in some cases, crop a portion of the image frame 202 that corresponds to a face. In some examples, the image frame engine 204 can perform a face detection process and/or face recognition process to detect and/or recognize a face within the image frame 202. The image frame engine 204 can generate or apply a bounding box around the face and can crop out the image data within the bounding box to generate an input image for the 3D model fitting engine 206.

The 3D model fitting engine 206 can receive an input image (e.g., the image frame 202, the cropped bounding box around the face in the image frame 202, etc.) from the image frame engine 204. Using the input image, the 3D model fitting engine 206 can perform a 3D model fitting technique to generate a 3D model (e.g., a 3DMM model) of the face (which can include the head of the person in the image frame 202). The 3D model fitting technique can include solving for shape coefficients $a_i$ and expression coefficients $b_j$. In some examples, the 3D model fitting can include solving for positional information related to the object. In the example of the object being a head of a person, the positional information may include pose information related to a pose of the head. For example, the pose information may indicate an angular rotation of the head with respect to a neutral position of the head. The rotation may be along a first axis (e.g., a yaw axis), a second axis (e.g., a pitch axis), and/or a third axis (e.g., a roll axis). In some cases, the 3D model fitting can also include a focal length for projection of the 3D model onto a 2D image using any suitable projection technique. In some examples, a weak perspective model can use the focal length produced by the 3D model fitting engine 206 to project the 3D vertices of the 3D model (e.g., the 3DMM) onto a 2D image. In some examples, a full perspective model can use the focal length produced by the 3D model fitting engine 206 to project the 3D vertices of the 3D model (e.g., the 3DMM) onto a 2D image.

The face reconstruction engine 208 can receive the coefficients generated by the 3D model fitting engine 206 to generate the 3D model (e.g., the 3DMM). The 3D model can be generated or constructed as a linear combination of a mean face (sometimes referred to as a neutral face), facial shape basis vectors, and facial expression basis vectors. The mean face can represent an average face that can be transformed (e.g., by the shape basis vectors and expression basis vectors) to achieve the desired final 3D face shape of the 3D model. The facial shape basis vectors can be used to scale proportions of the mean face. In some cases, the facial shape basis vectors may be used to represent a fat or thin face, a small or large nose, and any adjustment to the basic facial shape. In some implementations, the facial shape basis vectors are determined based on principal component analysis (PCA). In some cases, the facial expression basis vectors can represent facial expressions, such as smiling, lifting an eyebrow, blinking, winking, frowning, etc.

One illustrative example of facial expression basis vectors are blendshapes. As used herein, a blendshape can correspond to an approximate semantic parametrization of all or a portion of a facial expression. For example, a blendshape can correspond to a complete facial expression, or correspond to a "partial" (e.g., "delta") facial expression. Examples of partial expressions include raising one eyebrow, closing one eye, moving one side of the face, etc. In one example, an individual blendshape can approximate a linearized effect of the movement of an individual facial muscle. In some cases, the semantic representation can be modeled to correspond with movements of one or more facial muscles.

A 3D model S generated using a 3D model fitting technique (e.g., a 3DMM generated using a 3DMM fitting technique) can be a statistical model representing 3D geometry of an object (e.g., a face). For instance, a 3D model (e.g., a 3DMM) can be represented by a linear combination of a mean face $S_0$ with basis terms (also referred to as basis vectors) for facial shape $U_i$ and facial expressions $V_j$ with coefficients for facial shape $a_i$ and facial expressions $b_j$, for example, as follows:

$$S = S_0 + \Sigma_{i=1}^{M} a_i \cdot U_i + \Sigma_{j=1}^{N} b_j \cdot V_j \quad (1)$$

In the example of Equation (1), there are M facial shape coefficients $a_i$ and M facial shape basis vectors $U_i$ where M is an integer greater than or equal to 1. In some implementations, each of the mean face $S_0$, facial shape basis vectors $U_i$, and facial expression vectors $V_j$ can include position information for 3D vertices (e.g., x, y, and z coordinates) that can be combined to form the 3D model S. In some implementations, facial shape basis vectors $U_i$, and facial expression vectors $V_j$ can be expressed as positional offsets from the mean face $S_0$, where the coefficients for facial shape $a_i$ and facial expressions $b_j$ provide a scaling factor for corresponding offset vectors. In one illustrative example, the 3D model S includes three thousand 3D vertices. In one illustrative example, M is equal to 219, which corresponds to 219 facial shape basis vectors $U_i$ and facial shape coefficients $a_i$. In some implementations, the shape basis vectors $U_i$ can include principal component analysis eigenvectors. In some cases, there are N facial expression coefficients $b_j$ and N facial expression basis vectors where N is an integer greater than or equal to 1. In some cases, the facial expression vectors $V_j$ can include blendshape vectors. In one illustrative example, N is equal to 39, which corresponds to 39 facial expression basis vectors $V_j$ and 39 facial expression coefficients $b_j$ (e.g., 39 blendshapes and 39 blendshape coefficients). In some cases, the result of the linear combination shown in Equation (1) can be a 3D model (e.g., a 3DMM) of a face in a neutral pose. In some examples, the 3D model can be rotated with pose information such as yaw, pitch, and roll values to match the pose of the face in the image frame 202.

In some cases, the values for facial expression coefficients $b_j$ can be constrained between upper bounds $UB_j$ and lower bounds $LB_j$ so that $b_j \in [LB_j, UB_j]$. In one illustrative example, the facial expression coefficients $b_j$ are floating point values where $LB_j$ are all fixed at $LB_j=0.0$ and $UB_j$ are all fixed at $UB_j=1.0$, with $b_j \in [0,1]$. The facial expression coefficients constraints $LB_j$ and $UB_j$ can help prevent the coefficients generated by 3D model fitting engine 206 from creating unrealistic facial expressions in the 3D model. In many implementations that utilize blendshapes to represent facial expressions, it is a common practice to apply uniform upper and lower bounding values to all of the blendshape coefficients, such as the illustrative example of $b_j \in [0,1]$.

In some cases, however, the constraints placed on the facial expression coefficients can have the result of preventing the 3D modeling system 200 from being able to accurately model some human facial expressions (e.g., as shown in 3D facial model 104A of FIG. 1A above). As described in further detail below with respect to FIG. 3, during training, the 3D model fitting engine 206 can adaptively update the bounding values (e.g., the upper bounds $UB_j$ and lower bounds $LB_j$) for each facial expression coefficients using a data driven adaptive bounding technique during training.

The 3D modeling system 200 illustrated in FIG. 2 illustrates a functional block diagram that can be implemented in hardware, software, or any combination of the hardware and software. As an example, the functional blocks illustrated can use the illustrated relationships to identify functional blocks that can be converted into a universal modeling language (UML) diagram to identify an example implementation of the 3D modeling system 200 at least partially as an object oriented arrangement in software. However, the 3D modeling system 200 can be implemented without abstractions and, for example, as static functional implementations. In some examples, the 3D modeling system 200 can be implemented in whole or in part by a computing device or system with the architecture of computing system 1100 shown in FIG. 11.

Figure 3:
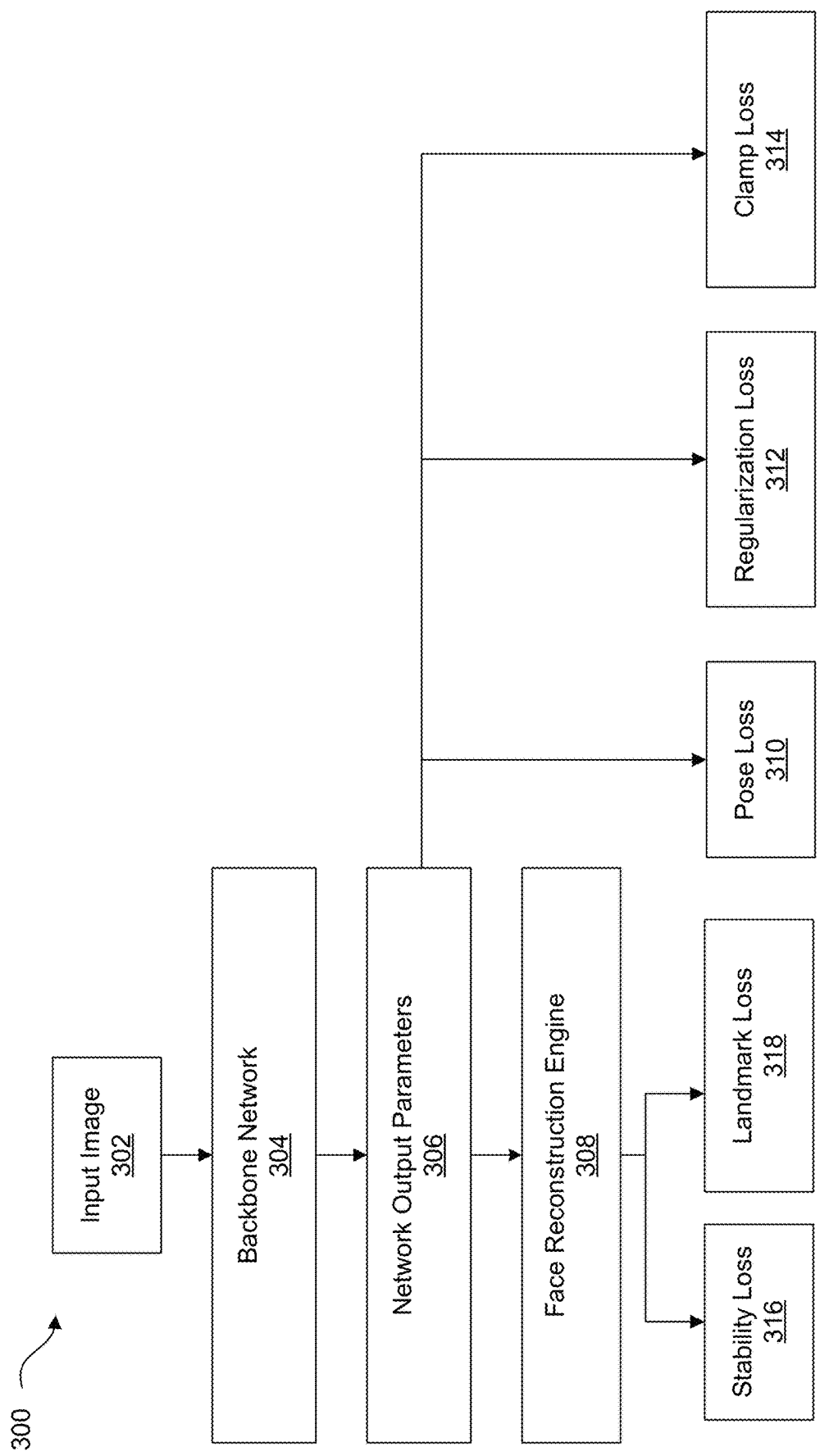
FIG. 3 is a diagram illustrating another example of a 3D model training system, in accordance with some examples.
Figure 4A:
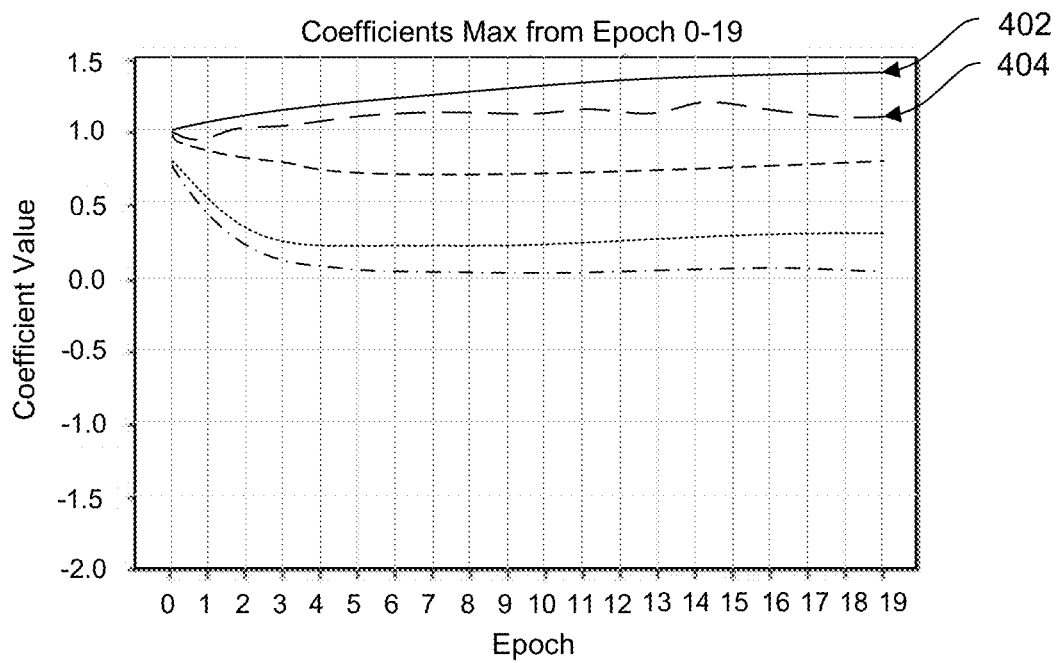
FIG. 4A, FIG. 4B, FIG. 4C, and FIG. 4D are plots illustrating maximum values of facial expression coefficients, in accordance with some examples.
Figure 4B:
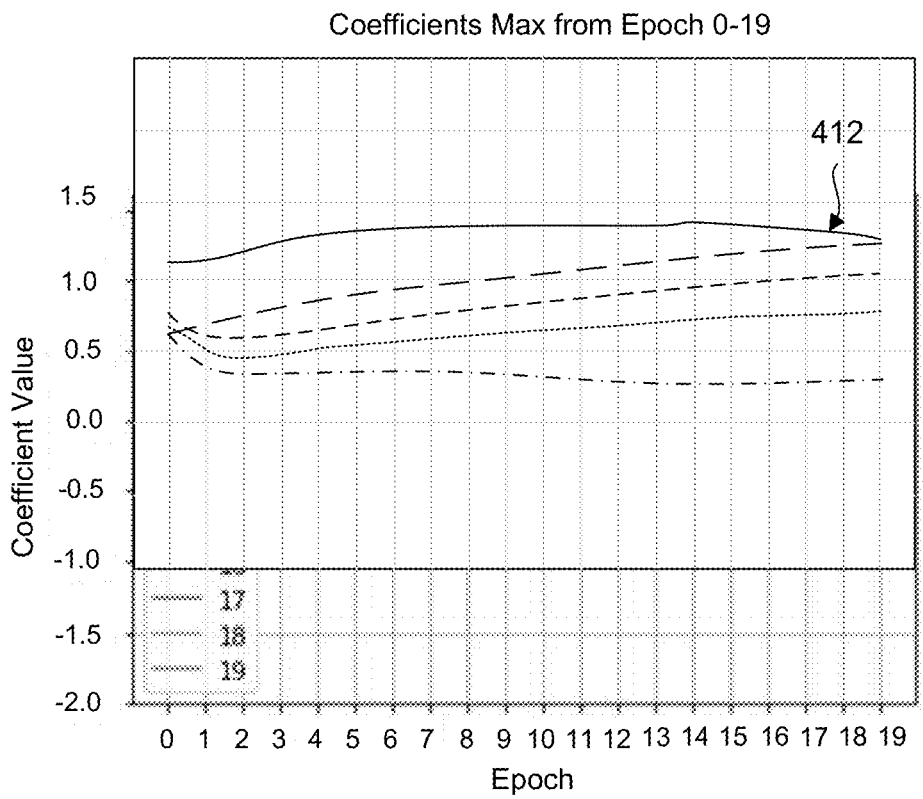
Figure 4C:
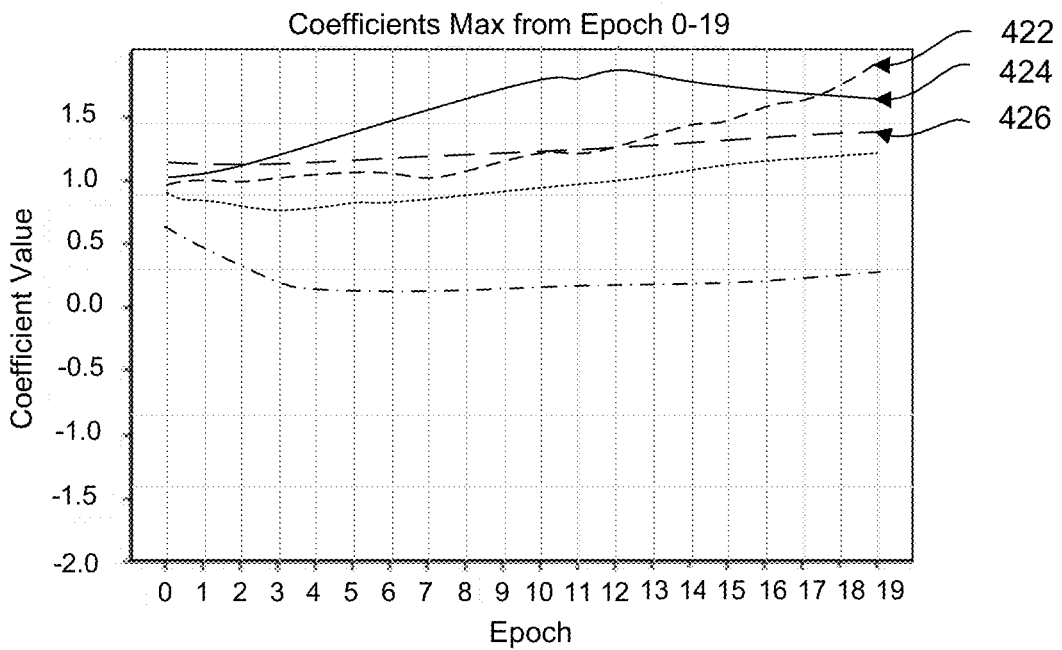
Figure 4D:
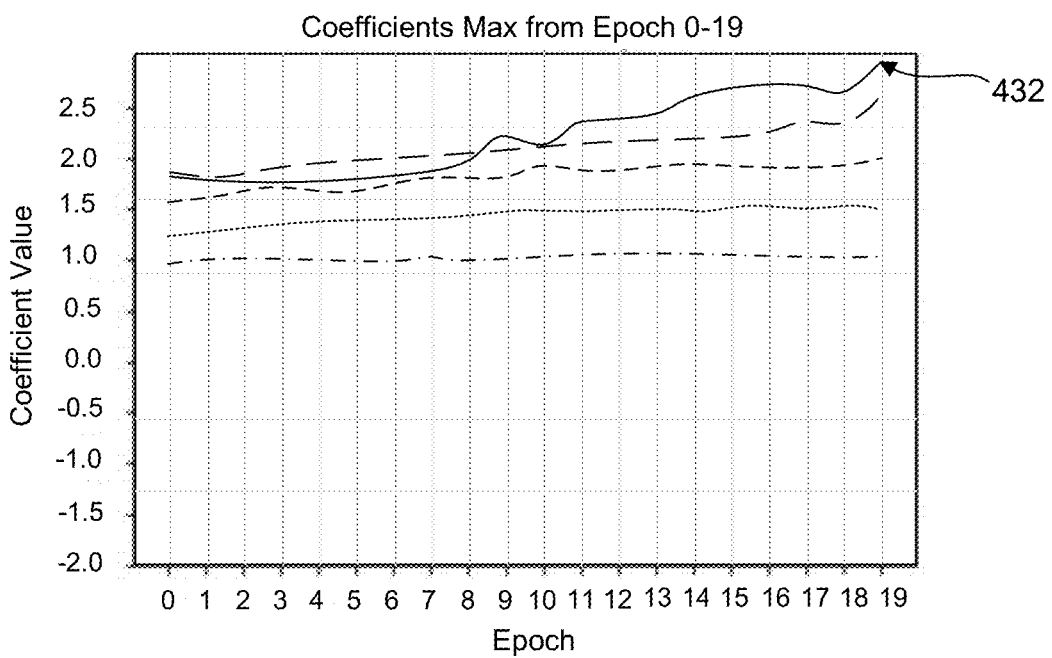
Figure 4E:
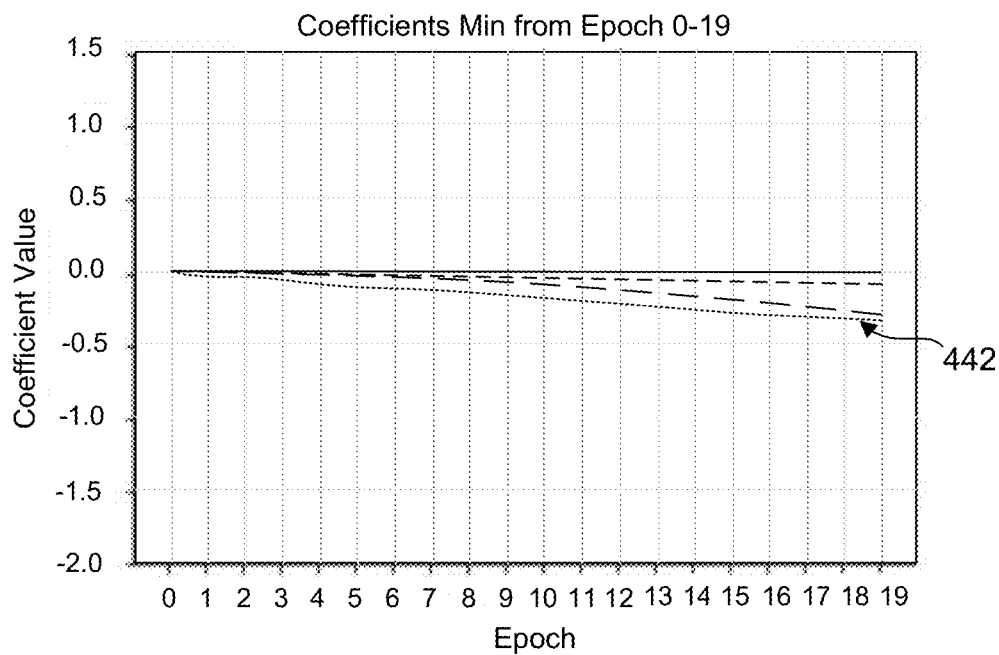
FIG. 4E, FIG. 4F, FIG. 4G, and FIG. 4H are plots illustrating minimum values of facial expression coefficients, in accordance with some examples.
Figure 4F:
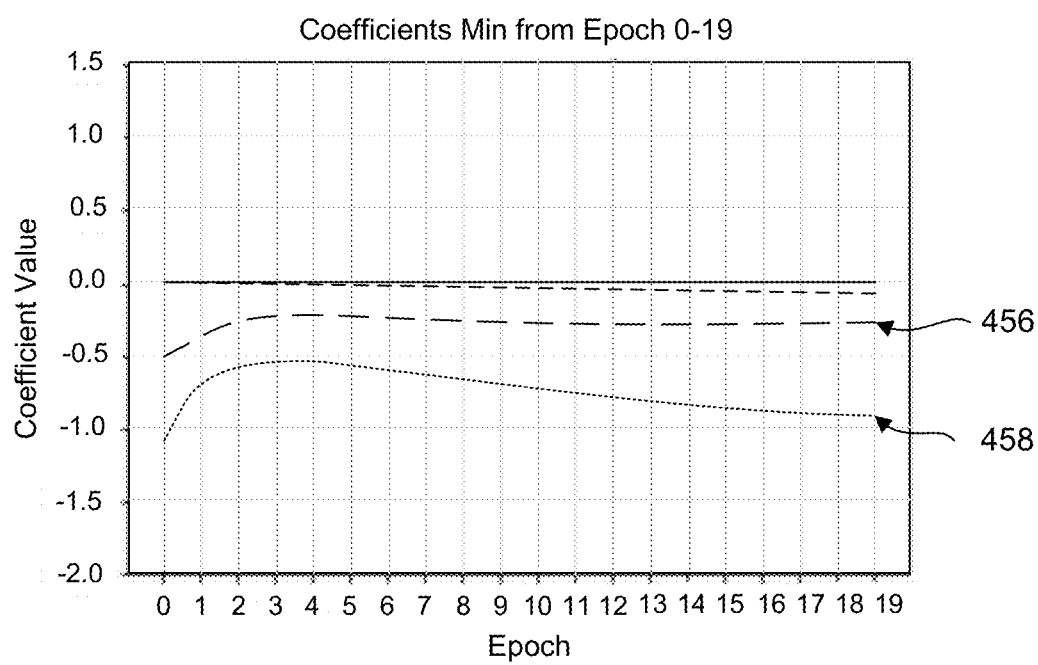
Figure 4G:
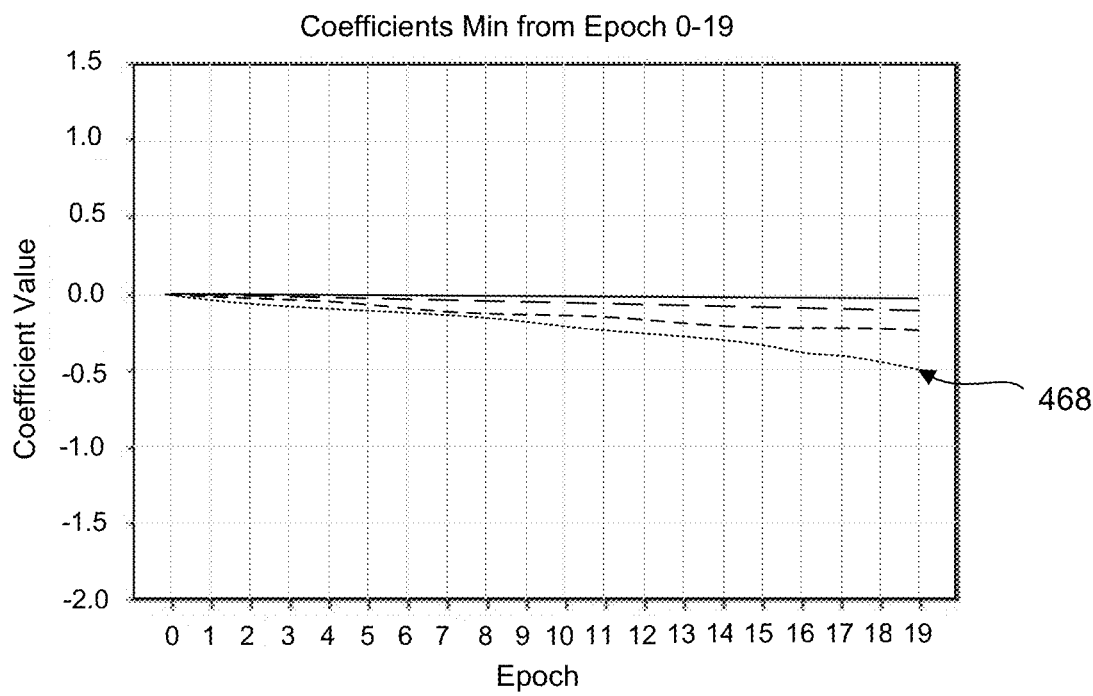
Figure 4H:
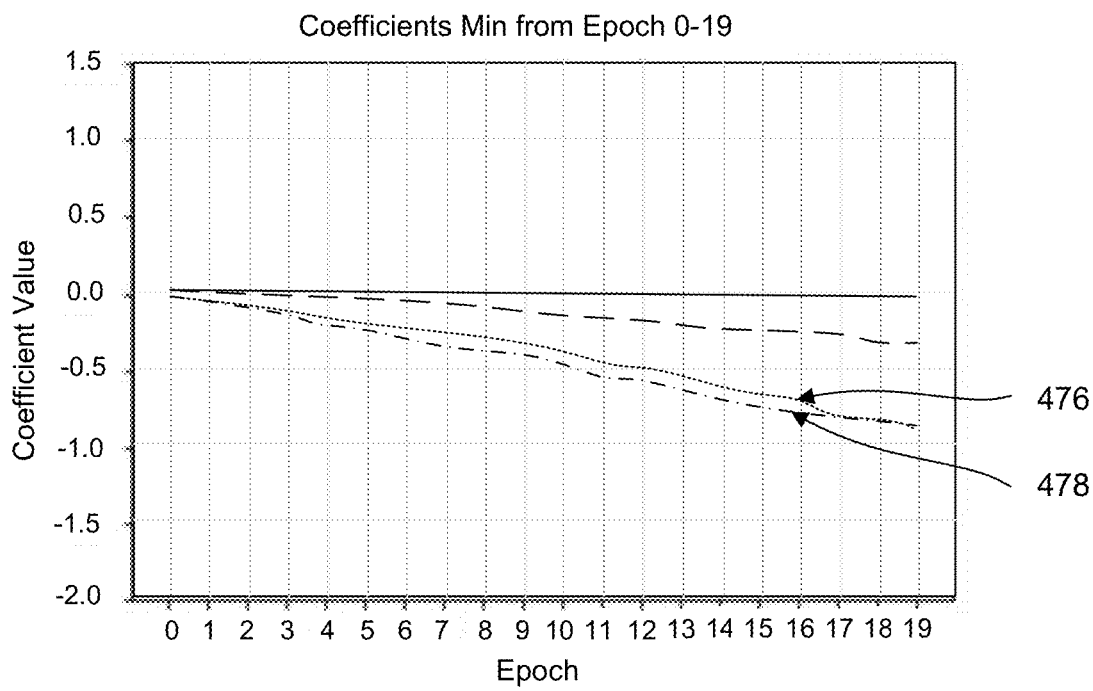
Figure 5A:
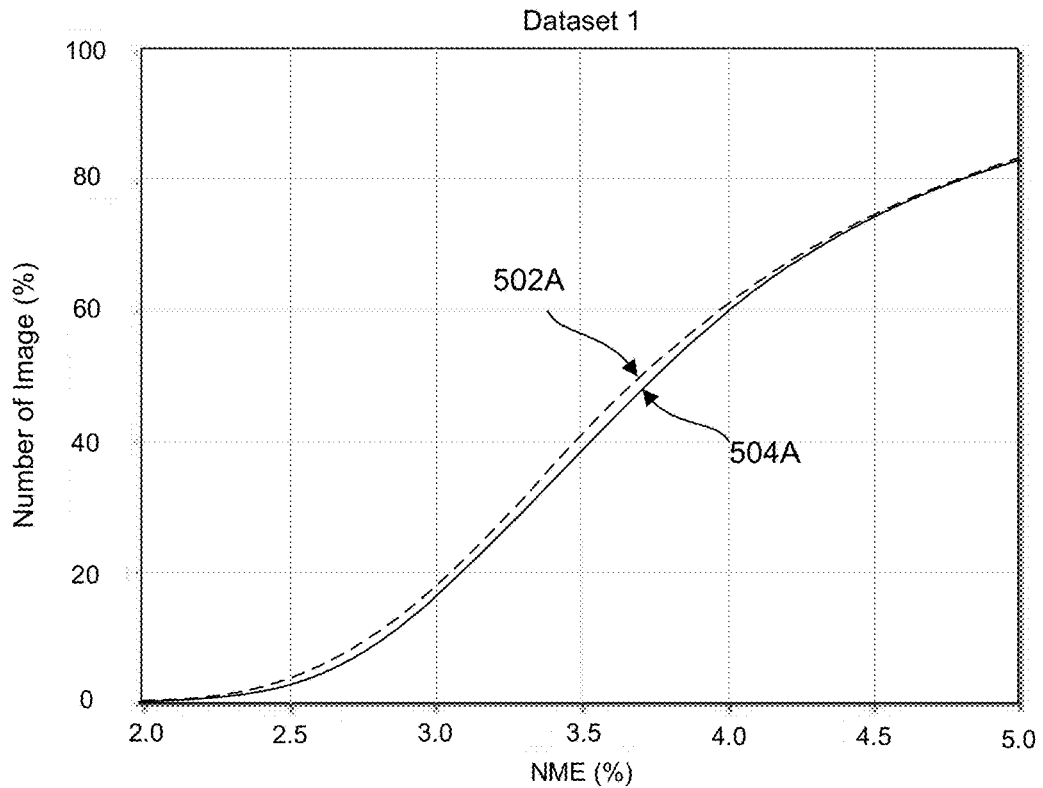
FIG. 5A, FIG. 5B, FIG. 5C, and FIG. 5D are plots illustrating cumulative distribution functions (CDFs) of normalized mean error (NME) for 3D models, in accordance with some examples.
Figure 5B:
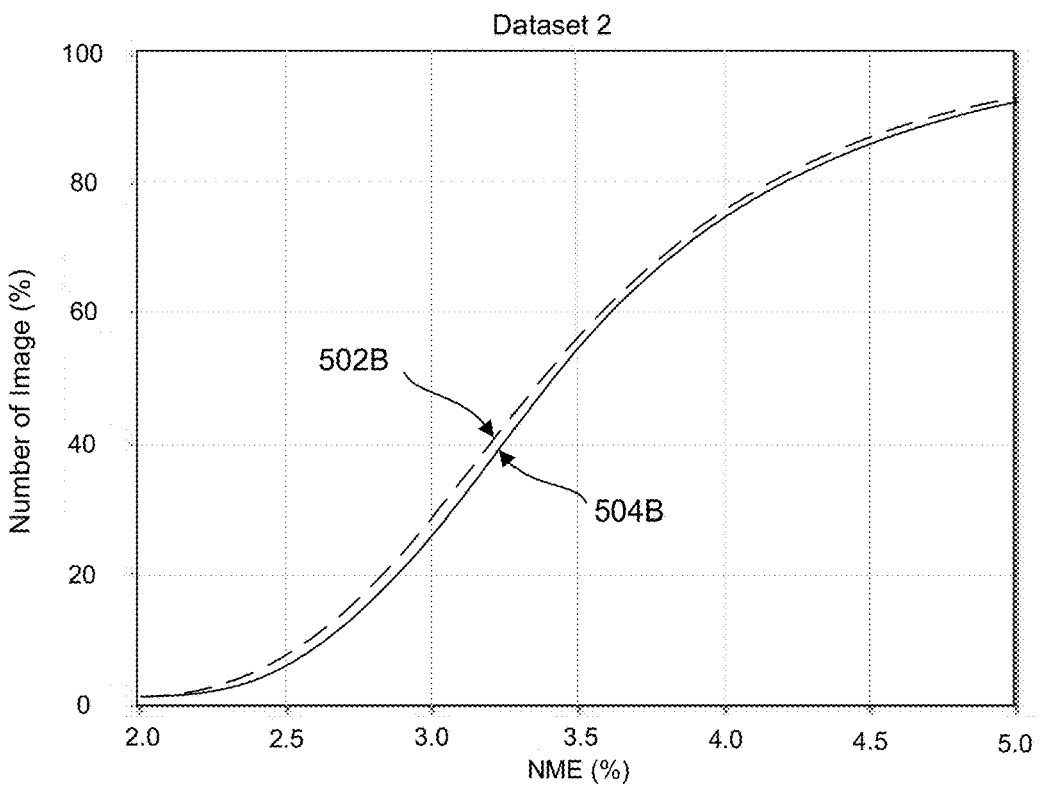
Figure 5C:
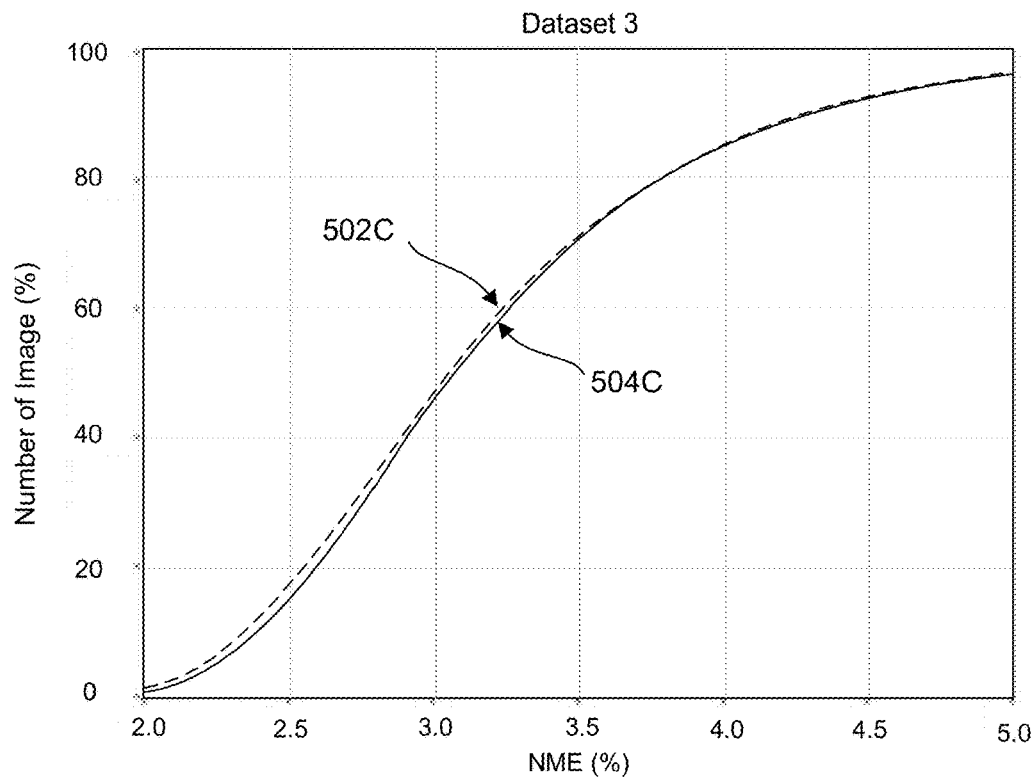
Figure 5D:
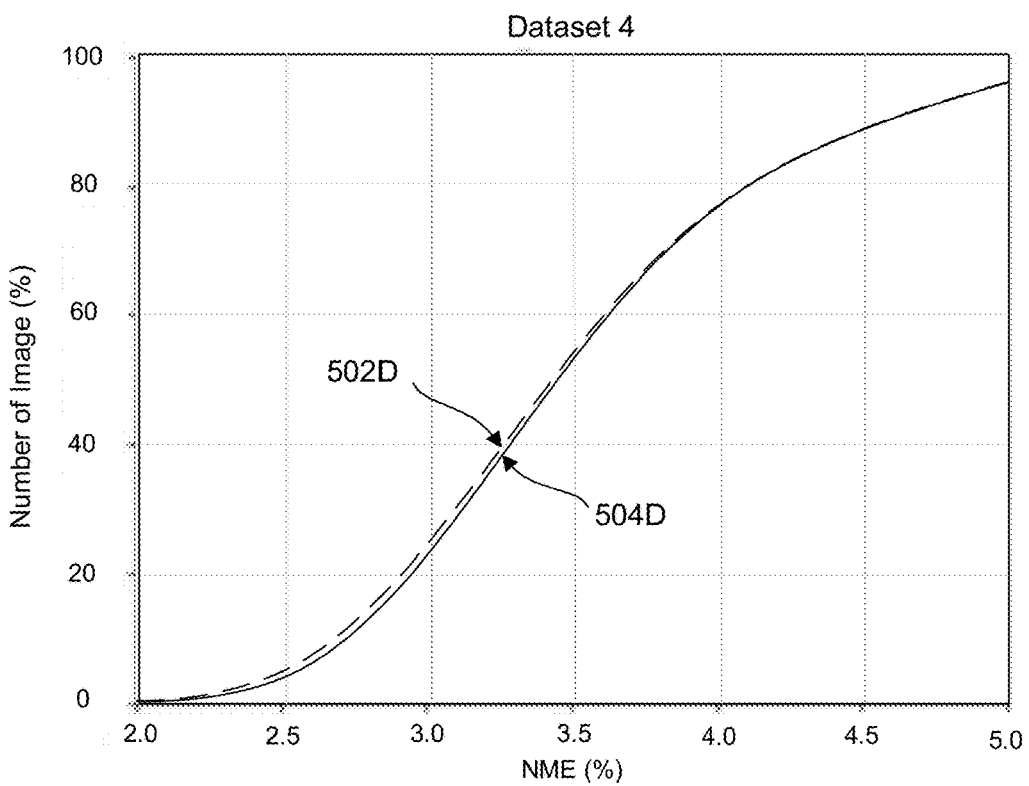

FIG. 3 is a diagram illustrating a 3D model training system 300 that can perform a data driven adaptive bounding training for facial expression coefficients of a 3D model (e.g., a 3DMM). As shown in FIG. 3, the 3D model training system 300 includes a backbone network 304, a face reconstruction engine 308, a pose loss 310, a regularization loss 312, a clamp loss 314, a stability loss 316, and a landmark loss 318.

In some cases, the backbone network can include a machine learning model (e.g., a deep neural network, such as a convolutional neural network (CNN), general adversarial network, etc.). The backbone network 304 can receive an input image 302 as an input. In some cases, the input image 302 can be one image of a plurality of images in a training dataset. The training dataset can include a large number of images that includes a variety of facial shapes and expressions in order to train the backbone network 304 to generate 3D facial models (e.g., 3DMMs) for a large variety of faces. In one illustrative example, a training dataset can include one million images, two million images, or any other suitably large number of images. The backbone network can be trained with the same training dataset through multiple iterations, also known as epochs. In some examples, an epoch comprises training the backbone network 304 with each of the images of the training dataset. In some cases, the training dataset used to train the backbone network 304 can include images and labels (e.g., in a supervised training process) indicating the known features in the frames. In some cases, the training dataset can include annotated ground truth 2D landmark information corresponding to the locations of facial features for each input image 302. In some cases, the 2D landmark information can be calculated from each input image 302 using a landmark algorithm. In some cases, the training dataset can also include annotated data about the pose of the face, including yaw, pitch, and roll values for each input image 302.

In some cases, the input image 302 can be converted to grayscale prior to being input into the backbone network 304. In some implementations, the input image 302 can be an image processed by a facial recognition or facial detection algorithm to provide a cropped image and bounding box around a face. For example, the input image could be a cropped grayscale image provided by image frame engine 204 of FIG. 2. The backbone network 304 can process the input image and perform a 3D model fitting (e.g., as described above with respect to 3D model fitting engine 206 in FIG. 2). In some cases, the backbone network 304 can produce network output parameters 306 as an output of the 3D model fitting. The network output parameters 306 can include facial shape coefficients (e.g., $a_i$ in Equation (1) above) and facial expression coefficients (e.g., $b_j$ in Equation (1) above). In some implementations, the network output parameters 306 can also include pose coefficients, including yaw ($\alpha$), pitch ($\beta$), and roll ($\gamma$). In some implementations, the network output parameters 306 can include a focal length f that can be used to project 3D vertices of a 3D model to a 2D image space using a weak perspective model (as described in more detail below). In some implementations, the network output parameters 306 can include an x-axis translation value $t_x$ and y-axis-translation value $t_y$.

Face reconstruction engine 308 can receive the network output parameters 306 to generate a 3D model (e.g., a 3DMM) and a projection of the 3D model into a 2D image space. The 3D model S (a facial model) can be generated according to Equation (1) above. As noted above, the 3D model S results in a facial model with a neutral pose. In some cases, the 3D model S can be rotated to create a posed 3D model $S_P$ according to Equation (2) below:

$$S_P = R(\alpha,\beta,\gamma)S \qquad (2)$$

where $R(\alpha,\beta,\gamma)$ is a 3×3 rotation matrix with $\alpha$, $\beta$, $\gamma$ rotation angles.

In some cases, the 3D model can be projected onto an image plane using any suitable projection technique. In one illustrative example, a weak perspective projection can be used to project the 3D model onto an image plane. Equation (3) below provides an example of how a weak perspective projection technique can be used to project X and Y components $$\begin{bmatrix} X \\ Y \end{bmatrix}$$

of each 3D vertex coordinate of the posed 3D model $S_P$ onto x and y coordinates of a 2D image $$\begin{bmatrix} x \\ y \end{bmatrix}$$

according to Equation (3) below:

$$\begin{bmatrix} x \\ y \end{bmatrix} = \frac{f}{Z_{ave}} \begin{bmatrix} X + t_x \\ Y + t_y \end{bmatrix} \qquad (3)$$

where f is the predicted focal length output by the backbone network 304, $Z_{ave}$ is the average depth (or distance) of the face from a weak perspective camera. The projection of Equation (3) can be performed for each 3D vertex of the posed 3D model $S_P$.

In another illustrative example, a full perspective model can be used to project the 3D model onto an image plane. For example, a full perspective projection can be provided by replacing the average depth $Z_{ave}$ in Equation 3 with the actual depth Z for each 3D vertex of the posed 3D model $S_P$. The weak perspective model and full perspective model techniques for projecting a 3D model onto an image plane, and any suitable projection technique can be used without departing from the scope of the present disclosure.

During training, the 3D model training system 300 can utilize one or more loss functions to analyze error in the network output parameters 306. For example, the 3D model training system 300 can determine a landmark loss 318 by comparing the annotated ground truth landmarks of the input image 302 to landmarks predicted by the backbone network 304 in a supervised training process. In some cases, the ground truth landmarks of the input image 302 are 2D landmarks. In some cases, the 2D ground truth landmarks can be compared with 2D landmarks predicted by the backbone network. The 2D landmarks predicted by the backbone network 304 can be determined from the projected 2D image generated from the posed 3D model $S_P$ using Equation (3) above. One example loss function includes a mean squared error (MSE). The MSE is defined as $E_{total} = \Sigma \frac{1}{2}(\text{target}-\text{output})^2$, which calculates the sum of one-half times the actual answer minus the predicted (output) answer squared. Another example loss function includes a normalized mean error, where the error between the ground truth landmarks and the landmarks predicted by the backbone network 304 can be normalized by the eye distance of the predicted face. In some cases, the 3D model training system 300 can also calculate a pose loss 310. In some cases, the ground truth pose information included with the input image 302 can be compared to the predicted pose parameters (e.g., yaw, pitch, and roll) output by the network output parameters 306. In some implementations, the pose loss 310 can represent an error between the ground truth pose information and the predicted pose parameters.

In some cases, the bounding size and position of the bounding box applied to the input image 302 (e.g., by image frame engine 204 of FIG. 2) can be changed between different frames or training intervals (e.g., per epoch, per batch, per mini-batch, etc.) of the training process for 3D model predictions of the backbone network 304. In some cases, a stability loss 316 can determine an error caused by the changes in the bounding box. For example, a stability loss 316 error function can be used to minimize errors in facial expression coefficients, 2D landmark positions, shape coefficients, or the like based on variations in the face bounding box size and offset. In some cases, deliberate resizing and offset of the face bounding box during training can improve the robustness of the trained backbone network 304 to variations in the face bounding box size and offset during inference (e.g., after the backbone network has been trained). The selection of a bounding box size and offset is also sometimes referred to as cropping or image cropping.

In some cases, the 3D model training system 300 can also determine a regularization loss 312. The regularization loss 312 can be used to prevent the facial shape coefficients $a_i$ in Equation (1) from becoming too large. For example, it can be beneficial to prevent the shape coefficients $a_i$ from becoming too large when the facial shape basis vectors $U_i$ are based on PCA.

In some examples, the 3D model training system 300 can also determine a clamp loss 314. The clamp loss 314 can be used to prevent the facial expression coefficients $b_j$ from becoming too large, which can result in artifacts (e.g., unrealistic facial expressions). The clamp loss 314 for each facial expression coefficient $b_j$ can be calculated according to Equation (4) below:

$$E_{cp}(b_j) = \begin{cases} LB_{k-1,j} - b_j, & \text{if } b_j < LB_{k-1,j} \\ b_j - UB_{k-1,j}, & \text{if } b_j > UB_{k-1,j} \\ 0, & \text{if } LB_{k-1,j} \le b_j \le UB_{k-1,j} \end{cases} \quad (4)$$

Where $LB_{k-1,j}$ and $UB_{k-1,j}$ are the lower and upper bounding values corresponding to each facial expression coefficient $b_j$ for the current training interval k−1, as will be described in more detail below.

In some implementations, $LB_{k-1,j}$ can be set to a static value of 0 and $UB_{k-1,j}$ can be set to a static value of 1. As explained above with respect to FIG. 2, in some cases, using a static upper bound and lower bound for the facial expression coefficients $b_j$ can result in an inability of the backbone network 304 to accurately reproduce real human facial expressions.

In some cases, an adaptive bounding technique can be used to update the upper and lower bounding values for each coefficient $b_j$ during each of R training intervals of the 3D model training system 300, where R is an integer greater than or equal to one. In some aspects, the upper and lower bound for each facial expression coefficients $b_j$ can be initialized according to Equation (5) and Equation (6) below:

$$LB_{0,j}=0 \quad (5)$$

$$UB_{0,j}=1 \quad (6)$$

In some cases, at the end of the current training interval k−1, the upper bounding values $UB_{k-1,j}$ and lower bounding values $LB_{k-1,j}$ for each of the facial expression coefficients $b_j$ from the current training interval can be updated according to Equation (7) and Equation (8) below:

$$UB_{k,j}=\delta \times UB_{k-1,j}+(1-\delta)\times Max_{k-1,j} \quad (7)$$

$$LB_{k,j}=\delta \times LB_{k-1,j}+(1-\delta)\times Min_{k-1,j} \quad (8)$$

where $Max_{k-1,j}$ are the maximum values of each of the coefficients $b_j$ during the current training interval, $Min_{k-1,j}$ are the minimum values of each of the coefficients $b_j$ during the current training interval, $UB_{k,j}$ and $LB_{k,j}$ are the updated upper and lower bounds for each facial expression coefficient $b_j$ for the next training interval k, and $\delta$ is a weighting factor that can take values between zero and one. The maximum and minimum values $Max_{k-1,j}$ and $Min_{k-1,j}$ can collectively be referred to as extremum values of the coefficients $b_j$. Equation (7) calculates a weighted average for each coefficient of the upper bounding value for the current training interval and the maximum value of the coefficient for the current training interval (e.g., the largest value of the coefficient $b_j$ produced by the backbone network 304 during the entire training interval). In one illustrative example, the weighting factor $\delta$ can be equal to 0.5, which provides an equal weighting between the current upper bounding value and the maximum value for the current training interval. Equation (8) similarly calculates a weighted average for the lower bounding values. The updates to the upper bounding and lower bounding values of Equation (7) and Equation (8) can be referred to as an adaptive bounding technique. In some examples, through this process, the backbone network 304 can learn to output values for the facial expression coefficients $b_j$ that fall between the upper bounding and lower bounding values.

During inference (e.g., after the backbone network 304 has been trained), the backbone network 304 can output facial expression coefficients with values that fall between the upper bounding values $UB_j$ and lower bounding values $LB_j$ that were obtained during the training process performed by the 3D model training system 300.

In some examples, each of the k training intervals can be an epoch of the training dataset (e.g., one pass of training the backbone network 304 with each image of the training dataset). In some examples, each of the k training intervals can a smaller portion such as a batch of images. In one illustrative example, a batch can include 1% of the total images in the training dataset. For example, for a training dataset with one million images, each batch can contain ten thousand images. In another illustrative example, a batch can include 50% of the total images in the training dataset.

Although specific examples of loss functions are described herein in association with the 3D model training system 300 including a pose loss 310, regularization loss 312, stability loss 316, and landmark loss 318, it should be understood that any suitable loss function can be used to analyze error in the output of the backbone network 304 without departing from the scope of the present disclosure.

FIG. 4A, FIG. 4B, FIG. 4C, and FIG. 4D are graphs illustrating example maximum values for different facial expression coefficients over multiple training intervals. Each of the graphs in FIG. 4A through FIG. 4D includes a plot of the maximum values per epoch of five different facial expression coefficients (e.g., blendshape coefficients). In the illustrated examples, the plotted coefficients correspond to a 3D model (e.g., a 3DMM) generated by a 3D modeling system trained according to the description of 3D modeling system 200 and/or 3D model training system 300 above. In the illustrated examples of FIG. 4A through FIG. 4D, the upper bound for each of the plotted coefficients was initialized to 1 (e.g., the 3D model training system obtained an initial upper bounding value of 1 for each facial expression coefficient). As described above regarding the 3D model training system 300, the model can be trained to update the upper bounding values for each coefficient at the end of each training interval (e.g., once per epoch, twice per epoch, once per batch, or any other training interval). In some of the plots, such as at least 402, 404, 412, 422, 424, 426, 432, 434, 436, 438, and 432, the maximum value of the coefficient during the initial epoch (e.g., epoch 0) is above the initial upper bounding value of 1. During training, the upper bound corresponding to each of the facial expression coefficients can be updated at the end of each training interval as described above with respect to FIG. 2. These plots illustrate that a fixed upper bound of 1 can result in inaccurate representation of facial expressions that are affected by the facial expression coefficients having maximum values greater than 1. As noted above, although the plot illustrates values of the facial expression coefficients at each epoch, a different training interval, such as a partial epoch (e.g., half an epoch, a third of an epoch, a quarter of an epoch, two epochs, etc.), a batch of frames, or any other training interval can be used without departing from the scope of the present disclosure.

FIG. 4E, FIG. 4F, FIG. 4G, and FIG. 4H are graphs illustrating example lower bounding values for different facial expression coefficients over multiple training intervals. Each of the graphs in FIG. 4E through FIG. 4H includes a plot of the minimum values per epoch of four different facial expression coefficients (e.g., blendshape coefficients). In the illustrated examples, the plotted coefficients correspond to a 3D model (e.g., a 3DMM) generated by a 3D modeling system trained according to the description 3D modeling system 200 and/or 3D model training system 300 above. In the illustrated examples of FIG. 4E through FIG. 4H, the lower bound for each of the plotted coefficients was initialized to (e.g., the 3D model training system obtained an initial lower bounding value of 0 for each facial expression coefficient). As described above regarding the 3D model training system 300, the model can be trained to update the lower bounding values for each facial expression coefficient at the end of each training interval (e.g., once per epoch, twice per epoch, once per batch, or any other training interval). In some of the plots, such as at least 442, 456, 458, 468, 476 and 478, the minimum value of the coefficient during the initial epoch (e.g., epoch 0) is below of the initial lower bounding value of 0. During training, the upper bound corresponding to each of the facial expression coefficients can be updated at the end of each training interval as described above with respect to FIG. 2. These plots illustrate that a fixed lower bound of 0 can result in inaccurate representation of facial expressions that are affected by the facial expression coefficients having minimum values less than 0. As noted above, although the plot illustrates values of the facial expression coefficients at each epoch, a different training interval, such as a partial epoch (e.g., half an epoch, a third of an epoch, a quarter of an epoch, two epochs, etc.), a batch of frames, or any other training interval can be used without departing from the scope of the present disclosure.

FIG. 5A, FIG. 5B, FIG. 5C, and FIG. 5D illustrate comparisons of accuracy between a 3D model (e.g., a 3DMM) generated by a 3D modeling system trained according to the adaptive bounding training of the present disclosure (e.g., trained according to the description of 3D modeling system 200 and/or 3D model training systems 300 above) and a 3D model generated by a 3D modeling system trained with fixed upper and lower bounding values for facial expression coefficients. The plots of FIG. 5A, FIG. 5B, FIG. 5C, and FIG. 5D illustrate cumulative distribution plots with y-axis values representing the percentage of images having a normalized mean error (NME) less than the corresponding x-axis value. In the illustrated examples, the mean error represents the average error between the projected landmarks from the 3D facial model produced by the trained 3D model neural network and the landmarks of the 2D facial image. The plots 502A, 502B, 502C, and 502D correspond to 3D facial models generated by a neural network trained with an adaptive upper and lower bound for facial expression coefficients (e.g., trained according to the description of 3D model training system 300 of FIG. 3 above). The plots 504A, 504B, 504C, and 504D correspond to 3D facial models generated by a neural network with the same backbone trained with the same training dataset, but differing in that the upper and lower bounding values for the facial expression coefficients remained fixed throughout the training. The plots in FIG. 5A correspond to the GENKI-SZSL data set, the plots in FIG. 5B correspond to the GENKI-4K data set, the plots in FIG. 5C correspond to the HELEN dataset with VGA resolution, and the plots in FIG. 5D correspond to the Labeled Faces in the Wild dataset. The plots in FIGS. 5A, 5B, 5C, and 5D show that the 3D facial model generated by the neural network trained according to an adaptive bounding strategy and 3D a facial model generated with the same neural network backbone except for having fixed upper and lower bounds in some cases have nearly identical accuracy performance (e.g., in the case of the plots in FIG. 5C and FIG. 5D) and in some cases have slightly improved performance (e.g., in the case of the plots in FIG. 5A and FIG. 5B). The selected datasets illustrated in FIG. 5A through FIG. 5D were selected because they contain 2D facial images with more regular facial expressions that result in facial expression coefficients that fall within the initial bounding value range of [0, 1]. These plots illustrate that 3D models generated by neural networks trained with the adaptive bounding strategy can maintain a high level of accuracy for facial expressions that fall within the initial bounding ranges.

Figure 6:
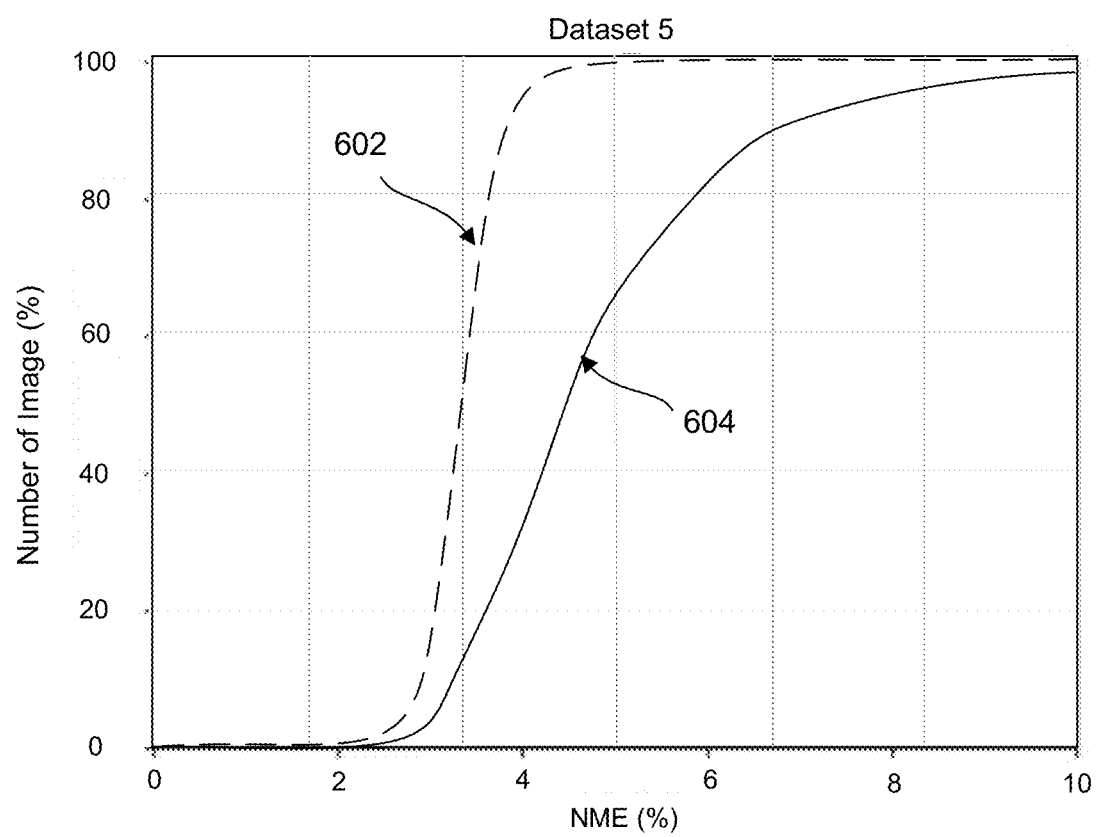
FIG. 6 is a plot illustrating CDFs of NME for different 3D models for a dataset containing irregular and/or extreme facial expressions, in accordance with some examples.

FIG. 6 illustrates a comparison of accuracy between a 3D model generated by a 3D modeling system trained with adaptive bounding and a 3D model generated by a 3D modeling system trained with fixed upper and lower bounding values for facial expression coefficients for a dataset that contains irregular and/or extreme facial expressions. The plots 602 and 604 in FIG. 6 illustrate cumulative distribution plots with y-axis values representing the percentage of images having a normalized mean error less than the corresponding x-axis values. In the illustrated examples, the mean error represents the average error between the projected landmarks from the 3D facial model produced by the trained 3D model neural network and the landmarks of the 2D facial image. The plot 602 shows the CDF of a 3D model generated by a 3D modeling system trained using the adaptive bounding training technique described with respect to FIG. 3 while the plot 604 shows the CDF of a 3D model generated by a 3D modeling system trained with fixed bounding values for facial expression coefficients. The dataset used to train each model included facial expressions that require blendshape coefficients outside of a standard range of a lower bound of 0 and an upper bound of 1 (also referred to herein as irregular expressions), such as the 2D facial image 102A in FIG. 1A, and the images 703 and 707 in FIG. 7A and FIG. 7B. The plots 602 and 604 show performance of the trained models during inference (e.g., after the models have been trained) for a dataset that contains similar irregular expressions that benefit from the adaptive bounding training technique of the present disclosure. The plot 602 of the CDF for the 3D model generated by a 3D modeling system trained using the adaptive bounding technique shows that approximately 98% of the images result in an NME less than 7%. In contrast, the plot 604 of the CDF for the 3D model generated by a 3D modeling system trained using a fixed bound range approximately 90% of the images result in an NME less than 7%. The plots 602 and 604 illustrate the potential advantages of training a 3D modeling system with an adaptive bounding technique of the present disclosure for performing 3D modeling of image datasets that contain irregular expressions.

Figure 7A:
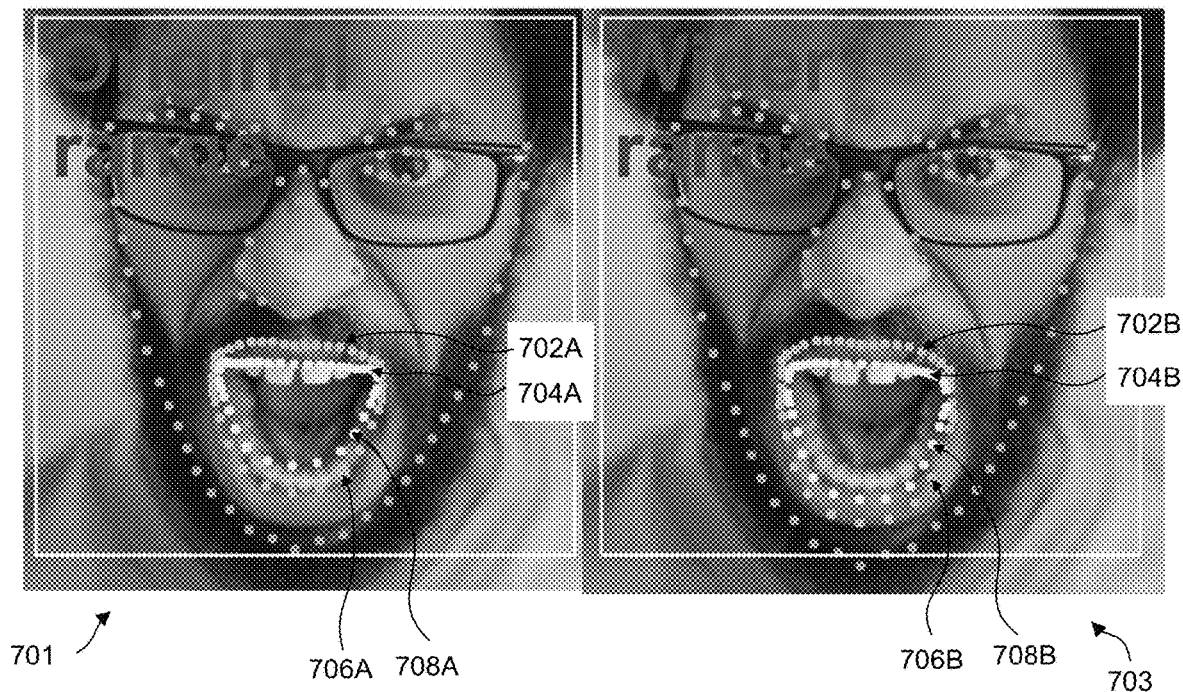
FIG. 7A, FIG. 7B, and FIG. 7C illustrate 2D landmarks projected onto input images for different 3D models, in accordance with some examples.
Figure 7B:
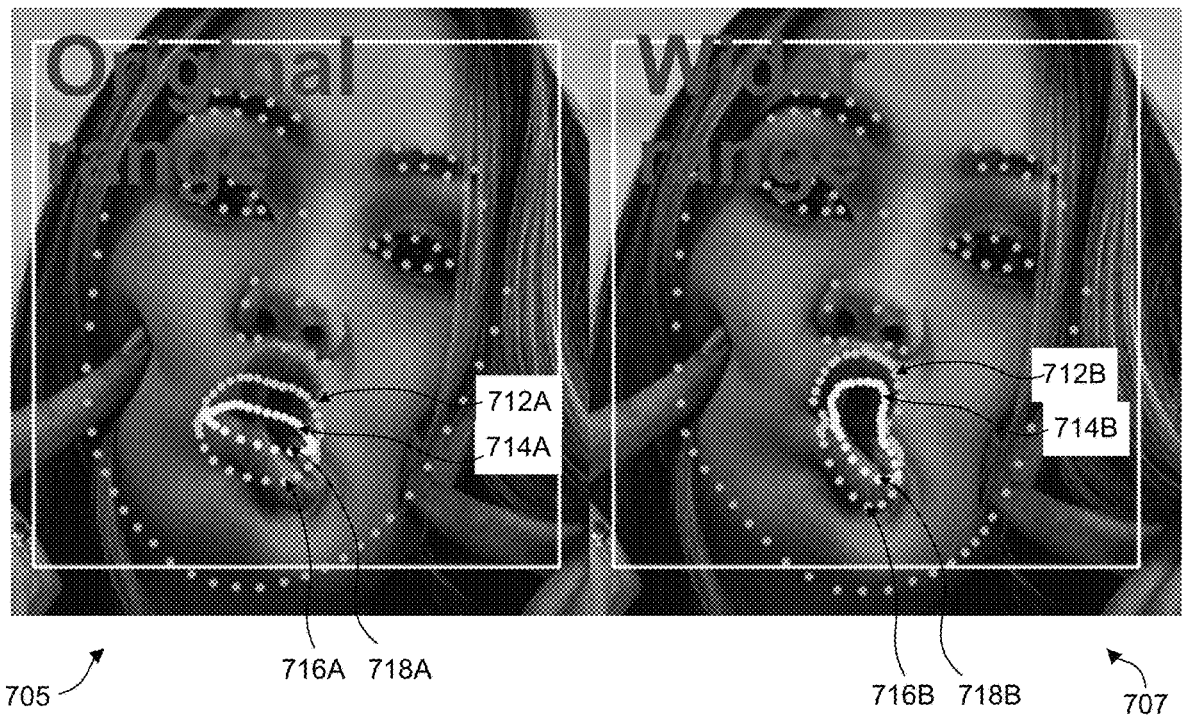

FIG. 7A and FIG. 7B illustrate example landmark features showing results from manual adjustment of blendshape coefficient values. The left side image 701 in FIG. 7A and left side image 705 in FIG. 7B illustrate the projection of a 3D model onto an input image (e.g., image frame 202 of FIG. 2 or input image 302 of FIG. 3) based on a 3D modeling system trained using fixed bounding values for facial expression coefficients (e.g., blendshape coefficients) during training (e.g., the upper and lower bounding values were fixed). The right side image 703 in FIG. 7A and right side image 707 in FIG. 7B illustrate the projection of a 3D model onto the same input image based on a manual adjustment of blendshape coefficients generated by the 3D model used for the left side images in FIG. 7A and FIG. 7B. In some cases, manual adjustment of the blendshape coefficients included adjusting the blendshape coefficient beyond the standard upper bounding value and lower bounding value (e.g., between zero and one) for the coefficient. The images 701 and 703 of FIG. 7A show similar fit for the upper contours 702A and 702B of the upper lip and lower contours 704A and 704B of the upper lip. However, the upper contour 706A and lower contour 708A of the lower lip in the left side image 701 based on the 3D modeling system trained with a fixed bounding range are projected onto the teeth of the input image in the left side image. In contrast, the right side image 703 shows that adjusting the bounding values for the facial expression coefficients can result in projection of the landmarks for the upper contour 706B and lower contour 708B of the lower lip that align with the lips of the input image.

FIG. 7B illustrates similar differences between a 3D modeling system trained with a fixed bounding range for facial expression coefficients in the left side image 705 compared to a 3D model with manually adjusted facial expression coefficients in the right side image 707. In the left side image 705 of FIG. 7B, none of the projected contours of the lips 712A, 714A, 716A, or 718A align well with the lips in the input image. In contrast, the projected contours of the lips 712B, 714B, 716B, and 718B in the right side image 707 show significant improvement in their alignment with the lips in the input image. Training a 3D modelling system according to the adaptive bounding technique disclosed herein can extend the range of facial expression coefficient values generated by a 3D modeling system beyond initial upper bounding values and lower bounding values provided for the facial expression coefficients. As shown in FIG. 7A and FIG. 7B, extending the range of facial expression coefficient values can result in improved fitting of the 3D model for some facial expressions. Accordingly, FIG. 7A and FIG. 7B illustrate the potential benefits of training a 3D modeling system with an adaptive bounding technique according to examples of the present disclosure.

Figure 7C:
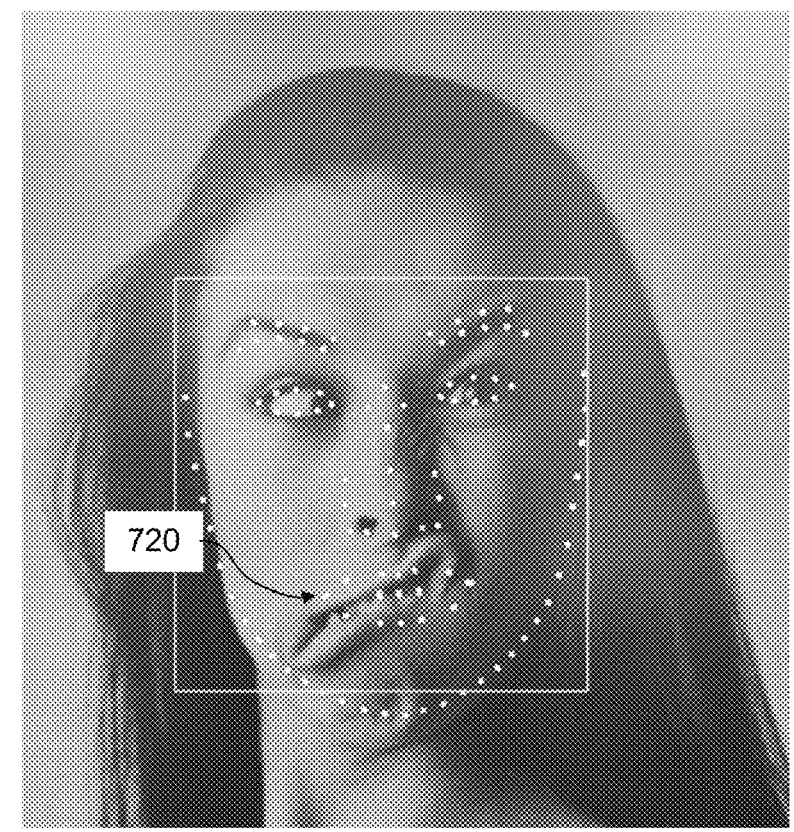
Figure 7C:
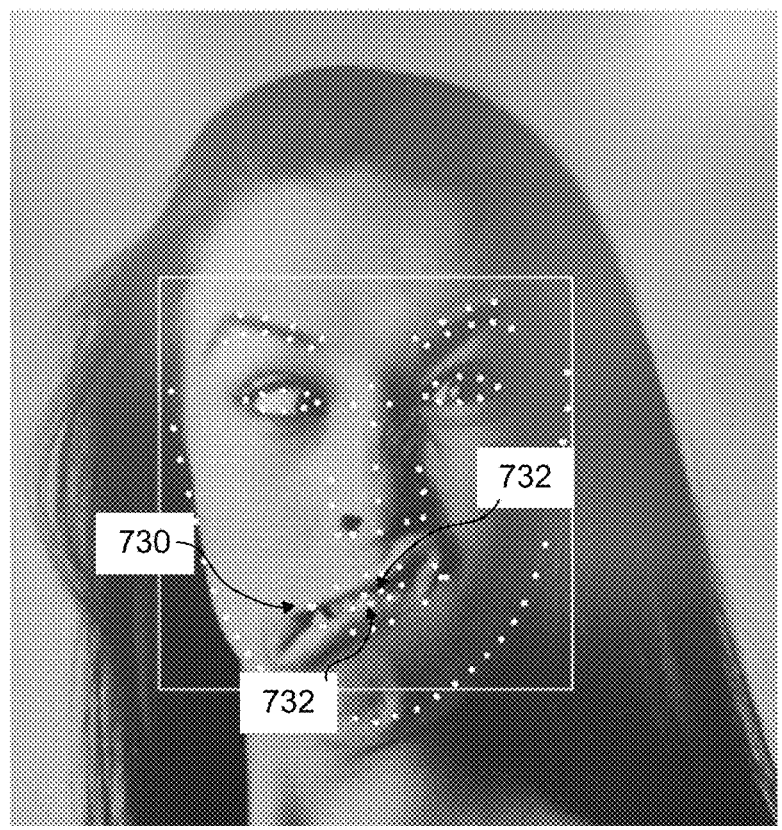

FIG. 7C illustrates example landmark features showing results from adaptive bounding training of a 3D modeling system. The upper image 709 illustrates the projection of a 3D model onto an input image (e.g., image frame 202 of FIG. 2 or input image 302 of FIG. 3) based on a 3D modeling system trained using fixed bounding values for facial expression coefficients (e.g., blendshape coefficients). The lower image 711 illustrates the projection of a 3D model generated from the same input image from a 3D modeling system trained using an adaptive bounding technique for determining the bounding values for facial expression coefficients. In the upper image 709, the landmarks 720 for the mouth show a slight tilt from lower left to upper right, with no opening of the lips. In the lower image, the landmarks 730 for the mouth show an increased tilt from lower left to upper right and a small gap between the landmarks for the bottom contour of the upper lip 732 and the upper contour of the lower lip 734. Both the additional tilt and the presence of a gap between upper and lower lips, which are both consistent with the appearance of the input image, can be attributed to training of the 3D modeling system using an adaptive bounding technique of the present disclosure. Accordingly, FIG. 7C provides an illustrative example of the benefits of training a 3D modeling system with an adaptive bounding technique according to examples of the present disclosure.

Figure 8:
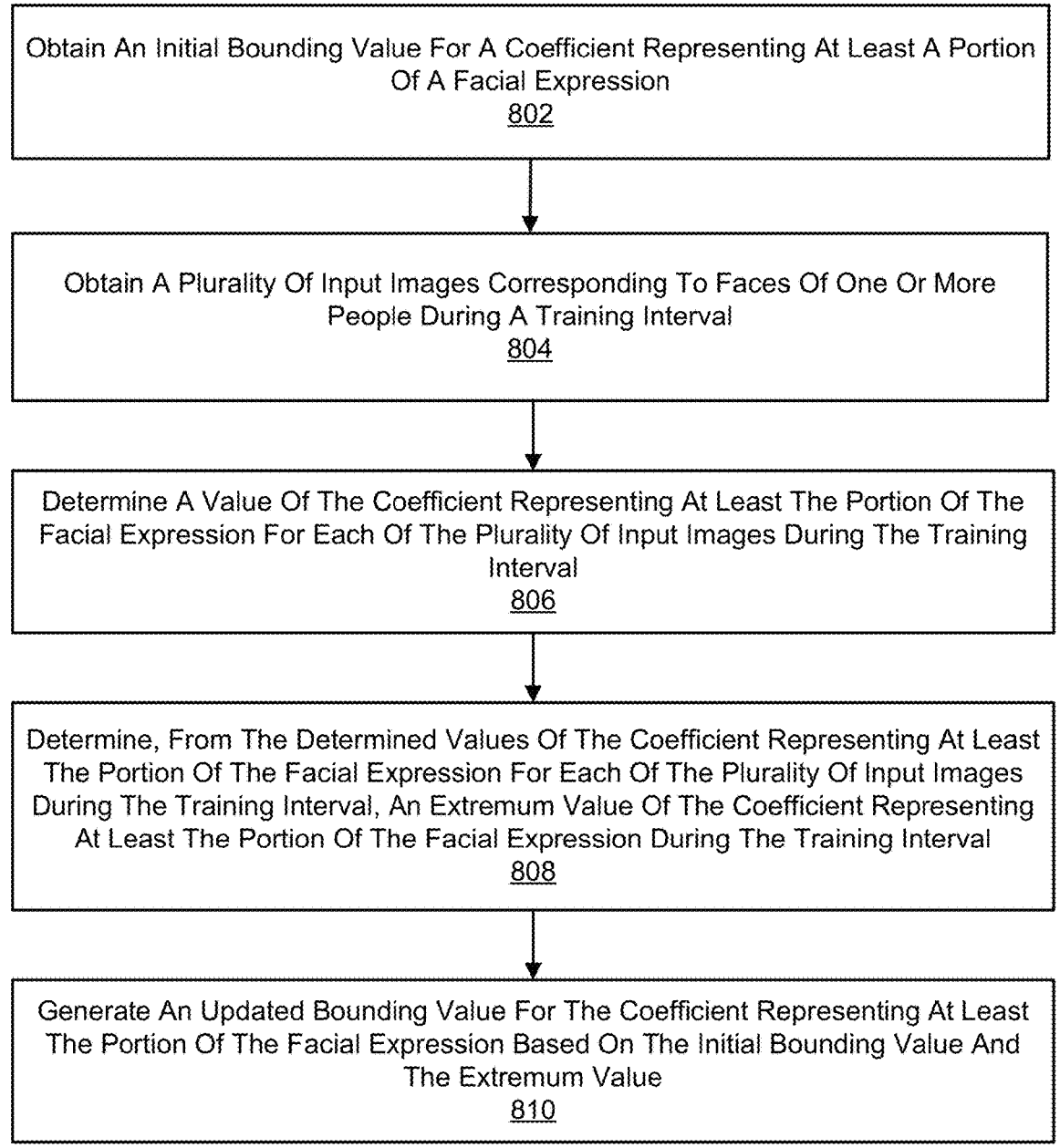
FIG. 8 is a flow diagram illustrating an example of a process for training a 3D model, in accordance with some examples.

FIG. 8 illustrates a flowchart of a process 800 for training one or more machine learning models. At block 802, the process 800 includes obtaining an initial bounding value for a coefficient representing at least a portion of a facial expression. In some examples, the initial bounding value can be an upper bounding value or a lower bounding value for the coefficient representing at least the portion of the facial expression. In one illustrative example, the coefficient representing at least the portion of the facial expression is a blendshape coefficient. In some examples, the initial bounding value comprises a maximum allowed value or a minimum allowed value of the coefficient representing the facial expression during the training interval.

At block 804, the process 800 includes obtaining a plurality of input images corresponding to faces of one or more people during a training interval. In some examples, the plurality of input images corresponding to faces of one or more people can be included in a training dataset. In some examples, the plurality of input images corresponding to faces of one or more people is included in a training dataset and the training dataset includes a plurality of landmark features associated with the plurality of input images.

At block 806, the process 800 includes determining a value of the coefficient representing at least the portion of the facial expression for each of the plurality of input images during the training interval. In one illustrative example, the value of the coefficient can be included in network output parameters 306 output by the backbone network 304 of FIG. 3. In some examples, the process 800 can generate a three-dimensional facial model based at least in part on the value of the coefficient representing at least the portion of the facial expression. In some examples, the three-dimensional facial model includes a 3DMM.

At block 808, the process 800 includes determining, from the determined values of the coefficient representing at least the portion of the facial expression for each of the plurality of input images during the training interval, an extremum value of the coefficient representing at least the portion of the facial expression during the training interval. In one illustrative example, the extremum value can be a maximum or minimum value of the coefficient during the training interval. In some examples, the training interval is an epoch of a training dataset. In some examples, the training interval is less than or equal to half an epoch of a training dataset. In some examples, the training interval can include one or more batches or mini-batches of a training dataset.

At block 810, the process 800 includes generating an updated bounding value for the coefficient representing at least the portion of the facial expression based on the initial bounding value and the extremum value. In some examples, generating the updated bounding value for the coefficient representing the facial expression comprises calculating a weighted average of the initial bounding value and the extremum value. In one illustrative example, the weighted average can be computed according to Equation 7 and/or Equation 8. In some examples, the initial bounding value and the extremum value can be weighted equally (e.g., $\delta=0.5$). In some examples, the initial bounding value is different from the updated bounding value. The updating bounding value can extend beyond a standard range for a facial expression coefficient, (e.g., a blendshape coefficient). In one illustrative example, a standard range for facial expression coefficients is between zero and one.

In some examples, the process 800 can apply a clamp loss function (e.g., Equation 4) based on the initial bounding value during the training interval. In some examples, during a subsequent training interval, the process 800 can apply the clamp loss function based on the updated bounding value. In some examples, applying the clamp loss function comprises determining a difference between the extremum value and the initial bounding value.

In some examples, the process 800 includes obtaining a second initial bounding value for a second coefficient representing at least a second portion of the facial expression. The process 800 can include determining a value of the second coefficient representing at least the second portion of the facial expression for each of the plurality of input images during the training interval. In some cases, the process 800 can include determining, from the determined values of the coefficient representing at least the second portion of the facial expression for each of the plurality of input images during the training interval, a second extremum value of the second coefficient representing at least the second portion of the facial expression during the training interval. In some cases, the process 800 can generate a second updated bounding value for the coefficient representing at least the second portion of the facial expression based on the second initial bounding value and the second extremum value. In some aspects, the second extremum value is different from the extremum value. In some cases, the second updated bounding value is different from the updated bounding value. In some implementations, the initial bounding value is an upper bounding value or a lower bounding value for the coefficient representing at least the portion of the facial expression.

In other examples, a device may include an application or function to perform some of the processes described herein (e.g., process 800 and/or any other process described herein). In some examples, the processes described herein (e.g., process 800 and/or any other process described herein) may be performed by a computing device or apparatus. In some examples, the process 800 can be performed by the 3D modeling system 200 and/or 3D model training system 300 above. In another example, process 800 can be performed by a computing device or system with the architecture of the computing system 1100 shown in FIG. 11.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the process 800, 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
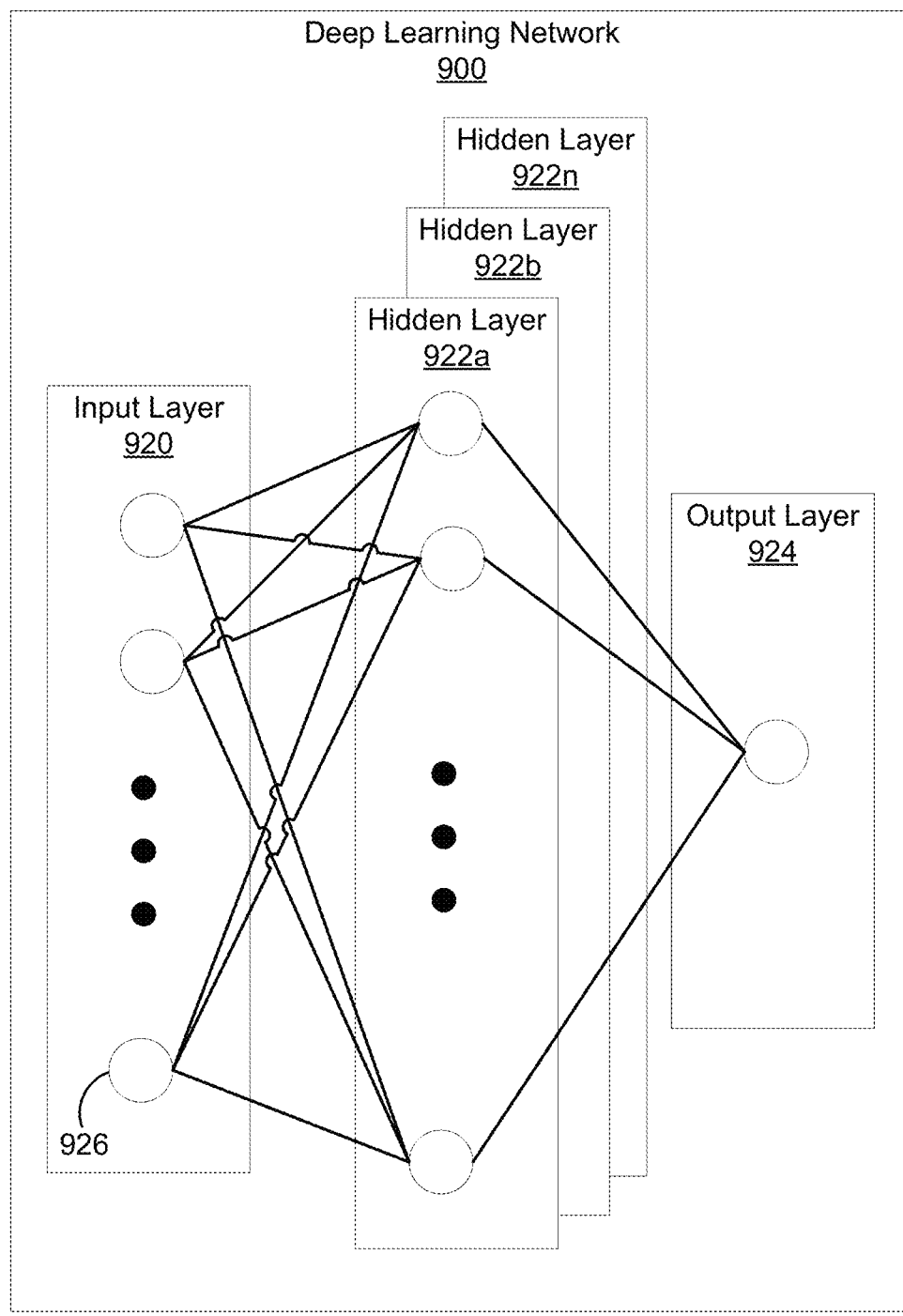
FIG. 9 is a block diagram illustrating an example of a deep learning network, in accordance with some examples.

FIG. 9 is an illustrative example of a deep learning neural network 900 that can be used by a 3D model training system. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to the information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \sum \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
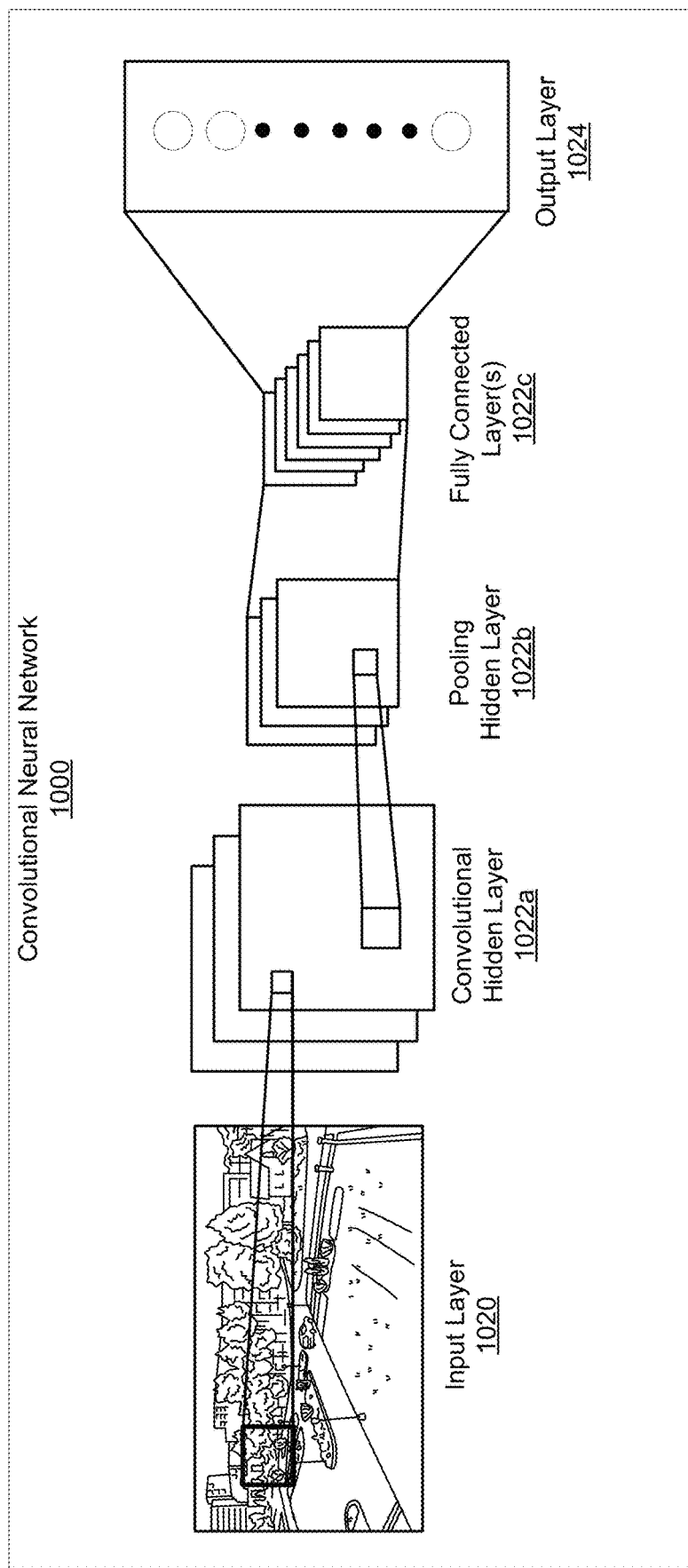
FIG. 10 is a block diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022*a*, an optional non-linear activation layer, a pooling hidden layer 1022*b*, and fully connected hidden layers 1022*c* to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022*a*. The convolutional hidden layer 1022*a* analyzes the image data of the input layer 1020. Each node of the convolutional hidden layer 1022*a* is connected to a region of nodes (pixels) of the input image called a receptive field. The convolutional hidden layer 1022*a* can be considered as one or more filters (each filter corresponding to a different activation or feature map), with each convolutional iteration of a filter being a node or neuron of the convolutional hidden layer 1022*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022*a*. Each connection between a node and a receptive field for that node learns a weight and, in some cases, an overall bias such that each node learns to analyze its particular local receptive field in the input image. Each node of the hidden layer 1022*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022*a* is due to each node of the convolutional layer being applied to its corresponding receptive field. For example, a filter of the convolutional hidden layer 1022*a* can begin in the top-left corner of the input image array and can convolve around the input image. As noted above, each convolutional iteration of the filter can be considered a node or neuron of the convolutional hidden layer 1022*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022*a*.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022*a*.

The mapping from the input layer to the convolutional hidden layer 1022*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022*a* can include several activation maps in order to identify multiple features in an image. The example shown in FIG. 10 includes three activation maps. Using three activation maps, the convolutional hidden layer 1022*a* can detect three different kinds of features, with each feature being detectable across the entire image.

In some examples, a non-linear hidden layer can be applied after the convolutional hidden layer 1022*a*. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1000 without affecting the receptive fields of the convolutional hidden layer 1022*a*.

The pooling hidden layer 1022*b* can be applied after the convolutional hidden layer 1022*a* (and after the non-linear hidden layer when used). The pooling hidden layer 1022*b* is used to simplify the information in the output from the convolutional hidden layer 1022*a*. For example, the pooling hidden layer 1022*b* can take each activation map output from the convolutional hidden layer 1022*a* and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
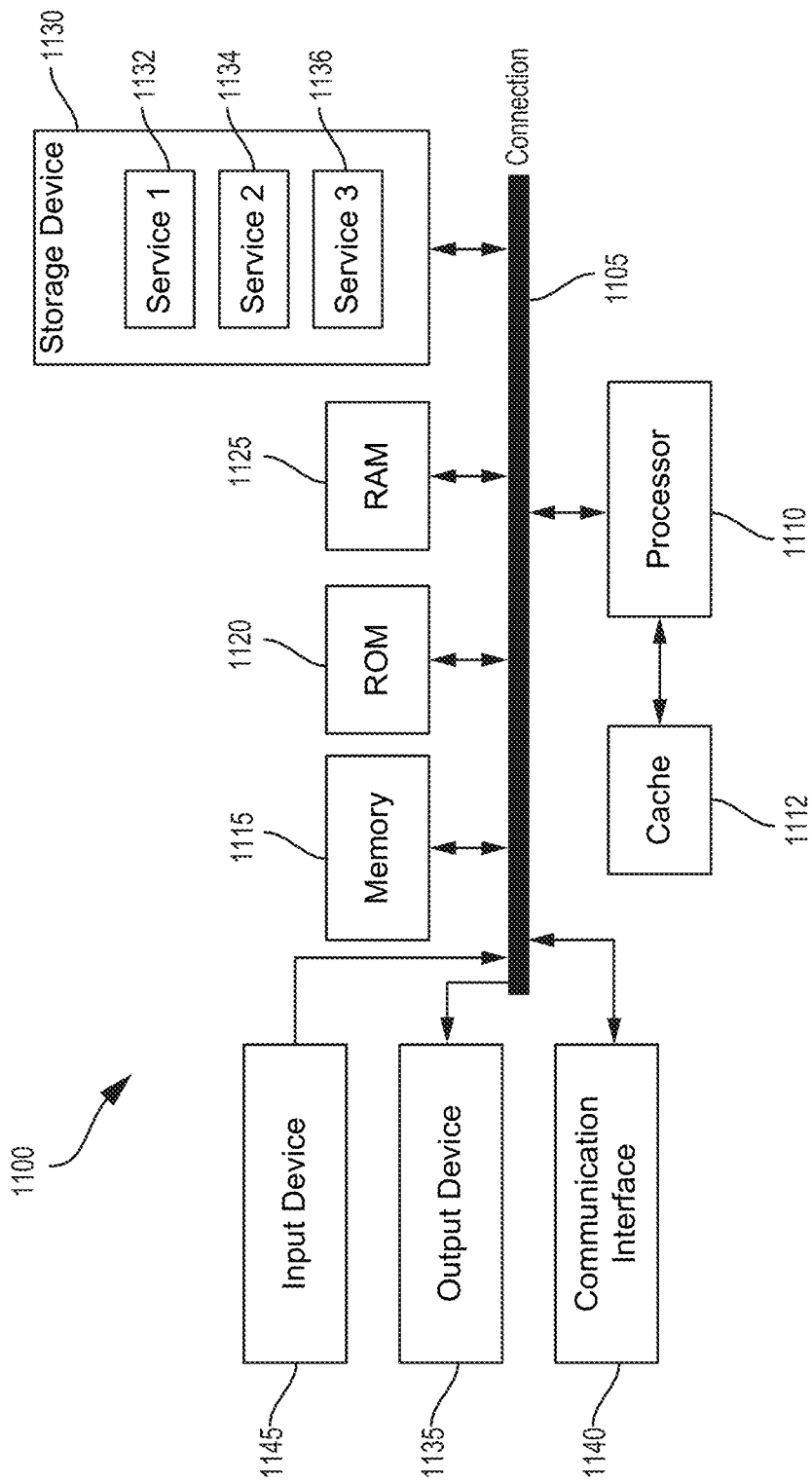
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for training one or more machine learning models, the method comprising: obtaining an initial bounding value for a coefficient representing at least a portion of a facial expression; obtaining a plurality of input images corresponding to faces of one or more people during a training interval; determining a value of the coefficient representing at least the portion of the facial expression for each of the plurality of input images during the training interval; determining, from the determined values of the coefficient representing at least the portion of the facial expression for each of the plurality of input images during the training interval, an extremum value of the coefficient representing at least the portion of the facial expression during the training interval; and generating an updated bounding value for the coefficient representing at least the portion of the facial expression based on the initial bounding value and the extremum value.

Aspect 2: The method of aspect 1, further comprising applying a clamp loss function based on the initial bounding value during the training interval.

Aspect 3: The method of aspect 2, further comprising: during a subsequent training interval, apply the clamp loss function based on the updated bounding value.

Aspect 4: The method of aspect 2, wherein applying the clamp loss function comprises determining a difference between the extremum value and the initial bounding value.

Aspect 5: The method of any one of aspects 1 to 4, wherein the training interval is an epoch of a training dataset.

Aspect 6: The method of any one of aspects 1 to 5, wherein the training interval is less than or equal to half an epoch of a training dataset.

Aspect 7: The method of any one of aspects 1 to 6, wherein the coefficient representing at least the portion of the facial expression is a blendshape coefficient.

Aspect 8: The method of any one of aspects 1 to 7, wherein generating the updated bounding value for the coefficient representing the facial expression comprises calculating a weighted average of the initial bounding value and the extremum value.

Aspect 9: The method of aspect 8, wherein the initial bounding value and the extremum value are weighted equally.

Aspect 10: The method of any one of aspects 1 to 9, wherein the initial bounding value is different from the updated bounding value.

Aspect 11: The method of any one of aspects 1 to 10, wherein the initial bounding value comprises a maximum allowed value or a minimum allowed value of the coefficient representing the facial expression during the training interval.

Aspect 12: The method of any one of aspects 1 to 11, wherein the plurality of input images corresponding to faces of one or more people is included in a training dataset and the training dataset includes a plurality of landmark features associated with the plurality of input images.

Aspect 13: The method of any one of aspects 1 to 12, wherein the one or more processors are configured to generate a three-dimensional facial model based at least in part on the value of the coefficient representing at least the portion of the facial expression.

Aspect 14: The method of aspect 13, wherein the three-dimensional facial model includes a three-dimensional morphable model (3DMM).

Aspect 15: The method of any one of aspects 1 to 14, further comprising: obtaining a second initial bounding value for a second coefficient representing at least a second portion of the facial expression; determining a value of the second coefficient representing at least the second portion of the facial expression for each of the plurality of input images during the training interval; determining, from the determined values of the coefficient representing at least the second portion of the facial expression for each of the plurality of input images during the training interval, a second extremum value of the second coefficient representing at least the second portion of the facial expression during the training interval; and generating a second updated bounding value for the coefficient representing at least the second portion of the facial expression based on the second initial bounding value and the second extremum value.

Aspect 16: The method of aspect 15, wherein the second extremum value is different from the extremum value.

Aspect 17: The method of aspect 16, wherein the second updated bounding value is different from the updated bounding value.

Aspect 18: The method of any one of aspects 1 to 17, wherein the initial bounding value is an upper bounding value or a lower bounding value for the coefficient representing at least the portion of the facial expression.

Aspect 19: An apparatus for training one or more machine learning models, comprising: a memory; and one or more processors coupled to the memory, the one or more processors configured to: obtain an initial bounding value for a coefficient representing at least a portion of a facial expression; obtain a plurality of input images corresponding to faces of one or more people during a training interval; determine a value of the coefficient representing at least the portion of the facial expression for each of the plurality of input images during the training interval; determine, from the determined values of the coefficient representing at least the portion of the facial expression for each of the plurality of input images during the training interval, an extremum value of the coefficient representing at least the portion of the facial expression during the training interval; and generate an updated bounding value for the coefficient representing at least the portion of the facial expression based on the initial bounding value and the extremum value.

Aspect 20: The apparatus of aspect 19, the one or more processors configured to: apply a clamp loss function based on the initial bounding value during the training interval.

Aspect 21: The apparatus of aspect 20, the one or more processors configured to: during a subsequent training interval, apply the clamp loss function based on the updated bounding value.

Aspect 22: The apparatus of aspect 20, wherein applying the clamp loss function comprises determining a difference between the extremum value and the initial bounding value.

Aspect 23: The apparatus of any one of aspects 19 to 22, wherein the training interval is an epoch of a training dataset.

Aspect 24: The apparatus of any one of aspects 19 to 23, wherein the training interval is less than or equal to half an epoch of a training dataset.

Aspect 25: The apparatus of any one of aspects 19 to 24, wherein the coefficient representing at least the portion of the facial expression is a blendshape coefficient.

Aspect 26: The apparatus of any one of aspects 19 to 25, wherein generating the updated bounding value for the coefficient representing the facial expression comprises calculating a weighted average of the initial bounding value and the extremum value.

Aspect 27: The apparatus of aspect 26, wherein the initial bounding value and the extremum value are weighted equally.

Aspect 28: The apparatus of any one of aspects 19 to 27, wherein the initial bounding value is different from the updated bounding value.

Aspect 29: The apparatus of any one of aspects 19 to 28, wherein the initial bounding value comprises a maximum allowed value or a minimum allowed value of the coefficient representing the facial expression during the training interval.

Aspect 30: The apparatus of any one of aspects 19 to 29, wherein the plurality of input images corresponding to faces of one or more people is included in a training dataset and the training dataset includes a plurality of landmark features associated with the plurality of input images.

Aspect 31: The apparatus of any one of aspects 19 to 30, wherein the one or more processors are configured to generate a three-dimensional facial model based at least in part on the value of the coefficient representing at least the portion of the facial expression.

Aspect 32: The apparatus of aspect 31, wherein the three-dimensional facial model includes a three-dimensional morphable model (3DMM).

Aspect 33: The apparatus of any one of aspects 19 to 32, the one or more processors configured to: obtain a second initial bounding value for a second coefficient representing at least a second portion of the facial expression; determine a value of the second coefficient representing at least the second portion of the facial expression for each of the plurality of input images during the training interval; determine, from the determined values of the coefficient representing at least the second portion of the facial expression for each of the plurality of input images during the training interval, a second extremum value of the second coefficient representing at least the second portion of the facial expression during the training interval; and generate a second updated bounding value for the coefficient representing at least the second portion of the facial expression based on the second initial bounding value and the second extremum value.

Aspect 34: The apparatus of aspect 33, wherein the second extremum value is different from the extremum value.

Aspect 35: The apparatus of aspect 34, wherein the second updated bounding value is different from the updated bounding value.

Aspect 36: The apparatus of any one of aspects 19 to 35, wherein the initial bounding value is an upper bounding value or a lower bounding value for the coefficient representing at least the portion of the facial expression.

Aspect 37: An apparatus for generating a three-dimensional facial model comprising:
a memory; and one or more processors coupled to the memory, the one or more processors configured to: obtain an input facial image; generate, by a machine learning model, a coefficient representing at least a portion of a facial expression based on the input facial image, wherein at least one of a maximum value and a minimum value corresponding to the coefficient representing the facial expression has a value trained according to an adaptive bounding training technique; and output a three-dimensional model corresponding to the input facial image based at least in part on the coefficient representing at least the portion of the facial expression.

Aspect 38: The apparatus of aspect 37, wherein training according to an adaptive bounding training technique comprises: obtaining an initial bounding value for the coefficient representing at least the portion of the facial expression; obtaining a plurality of input images corresponding to faces of one or more people during a training interval; determining a value of the coefficient representing at least the portion of the facial expression for each of the plurality of input images during the training interval; determining, from the determined values of the coefficient representing at least the portion of the facial expression for each of the plurality of input images during the training interval, an extremum value of the coefficient representing at least the portion of the facial expression during the training interval; and generating an updated bounding value for the coefficient representing at least the portion of the facial expression based on the initial bounding value and the extremum value.

Aspect 39: A non-transitory computer-readable storage medium having stored thereon instructions which, when executed by one or more processors, cause the one or more processors to perform any of the operations of aspects 1 to 38.

Aspect 40: An apparatus comprising means for performing any of the operations of aspects 1 to 38.

What is claimed is:

1. An apparatus for training one or more machine learning models, comprising:
a memory; and
one or more processors coupled to the memory, the one or more processors configured to:
obtain an initial bounding value for a coefficient representing at least a portion of a facial expression;
obtain a plurality of input images corresponding to faces of one or more people during a training interval;
determine a value of the coefficient representing at least the portion of the facial expression for each of the plurality of input images during the training interval;
determine, from the determined values of the coefficient representing at least the portion of the facial expression for each of the plurality of input images during the training interval, an extremum value of the coefficient representing at least the portion of the facial expression during the training interval; and
generate an updated bounding value for the coefficient representing at least the portion of the facial expression based on the initial bounding value and the extremum value.

2. The apparatus of claim 1, the one or more processors configured to:
apply a clamp loss function based on the initial bounding value during the training interval.

3. The apparatus of claim 2, the one or more processors configured to:
during a subsequent training interval, apply the clamp loss function based on the updated bounding value.

4. The apparatus of claim 2, wherein applying the clamp loss function comprises determining a difference between the extremum value and the initial bounding value.

5. The apparatus of claim 1, wherein the training interval is an epoch of a training dataset.

6. The apparatus of claim 1, wherein the training interval is less than or equal to half an epoch of a training dataset.

7. The apparatus of claim 1, wherein the coefficient representing at least the portion of the facial expression is a blendshape coefficient.

8. The apparatus of claim 1, wherein generating the updated bounding value for the coefficient representing the facial expression comprises calculating a weighted average of the initial bounding value and the extremum value.

9. The apparatus of claim 8, wherein the initial bounding value and the extremum value are weighted equally.

10. The apparatus of claim 1, wherein the initial bounding value is different from the updated bounding value.

11. The apparatus of claim 1, wherein the initial bounding value comprises a maximum allowed value or a minimum allowed value of the coefficient representing the facial expression during the training interval.

12. The apparatus of claim 1, wherein the plurality of input images corresponding to faces of one or more people is included in a training dataset and the training dataset includes a plurality of landmark features associated with the plurality of input images.

13. The apparatus of claim 1, wherein the one or more processors are configured to generate a three-dimensional facial model based at least in part on the value of the coefficient representing at least the portion of the facial expression.

14. The apparatus of claim 13, wherein the three-dimensional facial model includes a three-dimensional morphable model (3DMM).

15. The apparatus of claim 1, the one or more processors configured to:
obtain a second initial bounding value for a second coefficient representing at least a second portion of the facial expression;
determine a value of the second coefficient representing at least the second portion of the facial expression for each of the plurality of input images during the training interval;
determine, from the determined values of the coefficient representing at least the second portion of the facial expression for each of the plurality of input images during the training interval, a second extremum value of the second coefficient representing at least the second portion of the facial expression during the training interval; and
generate a second updated bounding value for the coefficient representing at least the second portion of the facial expression based on the second initial bounding value and the second extremum value.

16. The apparatus of claim 15, wherein the second extremum value is different from the extremum value.

17. The apparatus of claim 16, wherein the second updated bounding value is different from the updated bounding value.

18. The apparatus of claim 1, wherein the initial bounding value is an upper bounding value or a lower bounding value for the coefficient representing at least the portion of the facial expression.

19. An apparatus for generating a three-dimensional facial model comprising:
a memory; and
one or more processors coupled to the memory, the one or more processors configured to:
obtain an input facial image;
generate, by a machine learning model, a coefficient representing at least a portion of a facial expression based on the input facial image, wherein at least one of a maximum value and a minimum value corresponding to the coefficient representing the facial expression has a value trained according to an adaptive bounding training technique; and
output a three-dimensional model corresponding to the input facial image based at least in part on the coefficient representing at least the portion of the facial expression.

20. The apparatus of claim 19, wherein training according to an adaptive bounding training technique comprises:
obtaining an initial bounding value for the coefficient representing at least the portion of the facial expression;
obtaining a plurality of input images corresponding to faces of one or more people during a training interval;
determining a value of the coefficient representing at least the portion of the facial expression for each of the plurality of input images during the training interval;
determining, from the determined values of the coefficient representing at least the portion of the facial expression for each of the plurality of input images during the training interval, an extremum value of the coefficient representing at least the portion of the facial expression during the training interval; and
generating an updated bounding value for the coefficient representing at least the portion of the facial expression based on the initial bounding value and the extremum value.

21. A method for training one or more machine learning models, the method comprising:
- obtaining an initial bounding value for a coefficient representing at least a portion of a facial expression;
- obtaining a plurality of input images corresponding to faces of one or more people during a training interval;
- determining a value of the coefficient representing at least the portion of the facial expression for each of the plurality of input images during the training interval;
- determining, from the determined values of the coefficient representing at least the portion of the facial expression for each of the plurality of input images during the training interval, an extremum value of the coefficient representing at least the portion of the facial expression during the training interval; and
- generating an updated bounding value for the coefficient representing at least the portion of the facial expression based on the initial bounding value and the extremum value.

22. The method of claim 21, further comprising applying a clamp loss function based on the initial bounding value during the training interval.

23. The method of claim 22, further comprising:
- during a subsequent training interval, apply the clamp loss function based on the updated bounding value.

24. The method of claim 22, wherein applying the clamp loss function comprises determining a difference between the extremum value and the initial bounding value.

25. The method of claim 21, wherein the coefficient representing at least the portion of the facial expression is a blendshape coefficient.

26. The method of claim 21, wherein generating the updated bounding value for the coefficient representing the facial expression comprises calculating a weighted average of the initial bounding value and the extremum value.

27. The method of claim 26, wherein the initial bounding value and the extremum value are weighted equally.

28. The method of claim 21, wherein the initial bounding value is different from the updated bounding value.

29. The method of claim 21, wherein the initial bounding value comprises a maximum allowed value or a minimum allowed value of the coefficient representing the facial expression during the training interval.

30. The method of claim 21, wherein the plurality of input images corresponding to faces of one or more people is included in a training dataset and the training dataset includes a plurality of landmark features associated with the plurality of input images.

* * * * *